United States Patent [19]
Murata et al.

[11] Patent Number: 5,917,736
[45] Date of Patent: Jun. 29, 1999

[54] TWO-DIMENSIONAL INVERSE-DISCRETE COSINE TRANSFORM CIRCUIT

[75] Inventors: Eri Murata; Ichiro Kuroda, both of Tokyo, Japan

[73] Assignee: NEC Corporation, Tokyo, Japan

[21] Appl. No.: 08/907,922

[22] Filed: Aug. 11, 1997

[30] Foreign Application Priority Data

Aug. 23, 1996 [JP] Japan .................................. 8-241069

[51] Int. Cl.⁶ .................................................. G06F 17/14
[52] U.S. Cl. .................. 364/725.02; 364/725.03
[58] Field of Search .......................... 364/725.02, 725.03

[56] References Cited

U.S. PATENT DOCUMENTS

| | | | |
|---|---|---|---|
| 5,387,982 | 2/1995 | Kitaura et al. | 358/433 |
| 5,596,517 | 1/1997 | Jones et al. | 364/725.02 |
| 5,724,278 | 3/1998 | Ohgose et al. | 364/725.02 |
| 5,768,167 | 6/1998 | Kuroda | 364/725.02 |

FOREIGN PATENT DOCUMENTS

| | | |
|---|---|---|
| 2-224489 | 9/1990 | Japan . |
| 4-220082 | 8/1992 | Japan . |
| 6-52214 | 2/1994 | Japan . |
| 8-335885 | 12/1996 | Japan . |

OTHER PUBLICATIONS

Denshi Joho Tsushin Gakkai, Kiso/Kyokai Society Taikai Koen Ronbunshu (published Aug. 15, 1995), A–86, p. 88.

Ichiro Kuroda, "A Study on Fast 2D (I)DCT Algorithm", Information Technology Research Labs, NEC Corporation, Japan, pp. 1–3.

Ichiro Kuroda, "Processor Architecture Driven Algorithm Optimization for Fast 2D–DCT", Information Technology Research Labs., NEC Corporation, Japan, pp. 481–490.

*Primary Examiner*—David H. Malzahn
*Attorney, Agent, or Firm*—Foley & Lardner

[57] ABSTRACT

First to ninth determining units that receive input data of first to ninth tensor product calculating units are disposed. The first to ninth determining units determine whether or not the received data have non-zero data and supply the determined results to the relevant tensor product calculating units. When the first to ninth determining units have determined that all of the received data are zero data, the first to ninth tensor product calculating units do not perform tensor product calculations.

20 Claims, 21 Drawing Sheets

F I G. 10
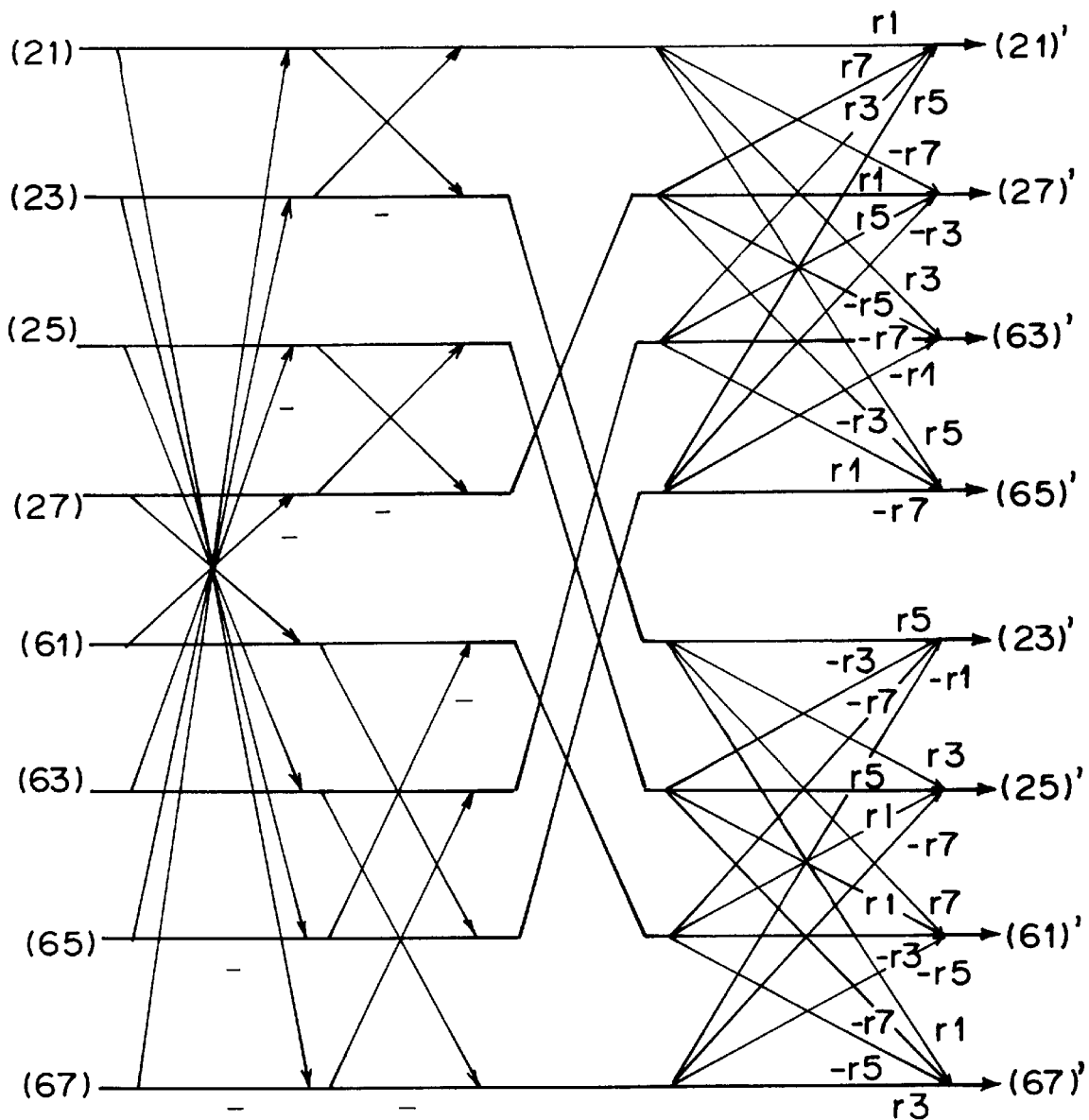

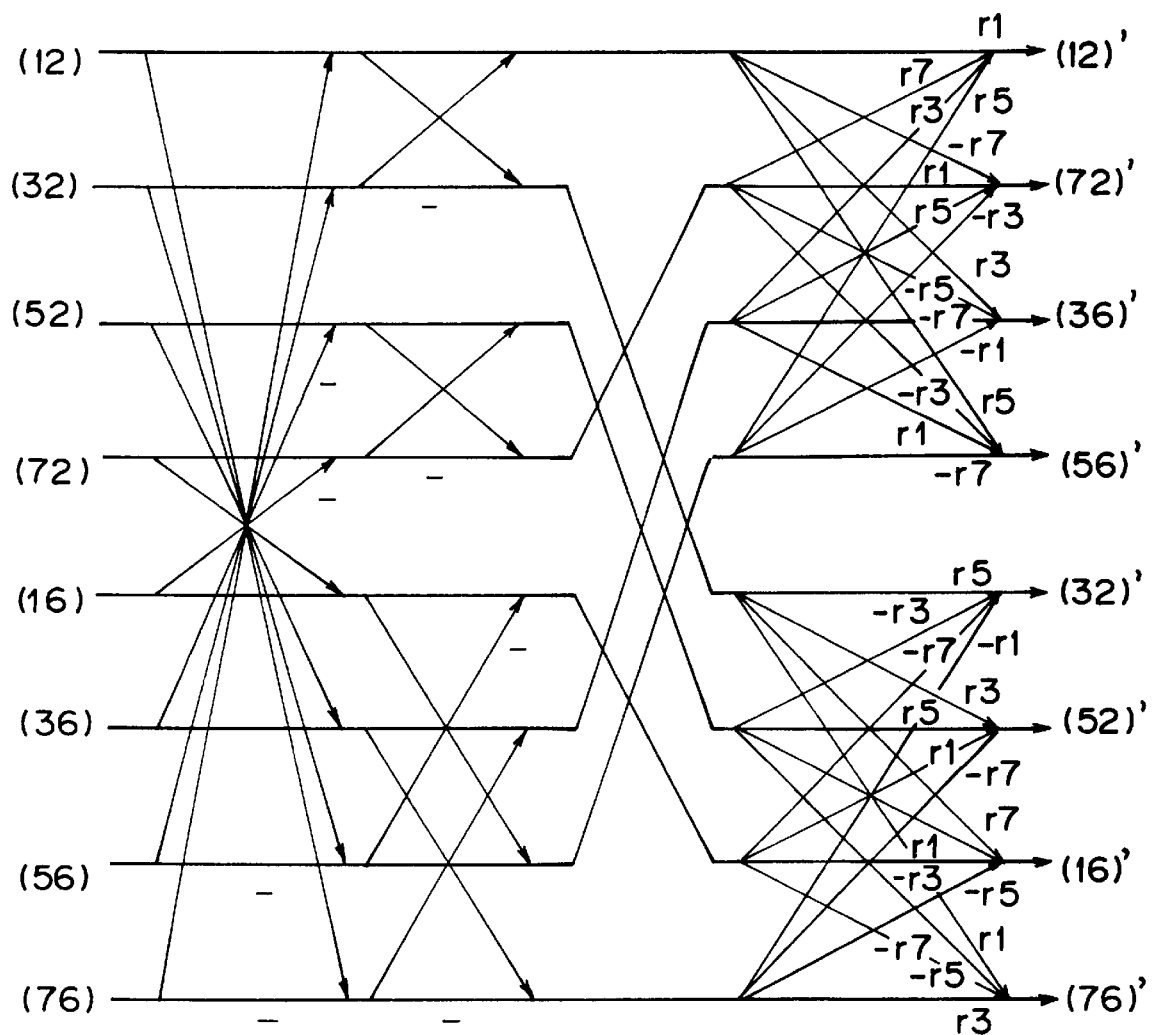
F I G. 12

F I G . 13
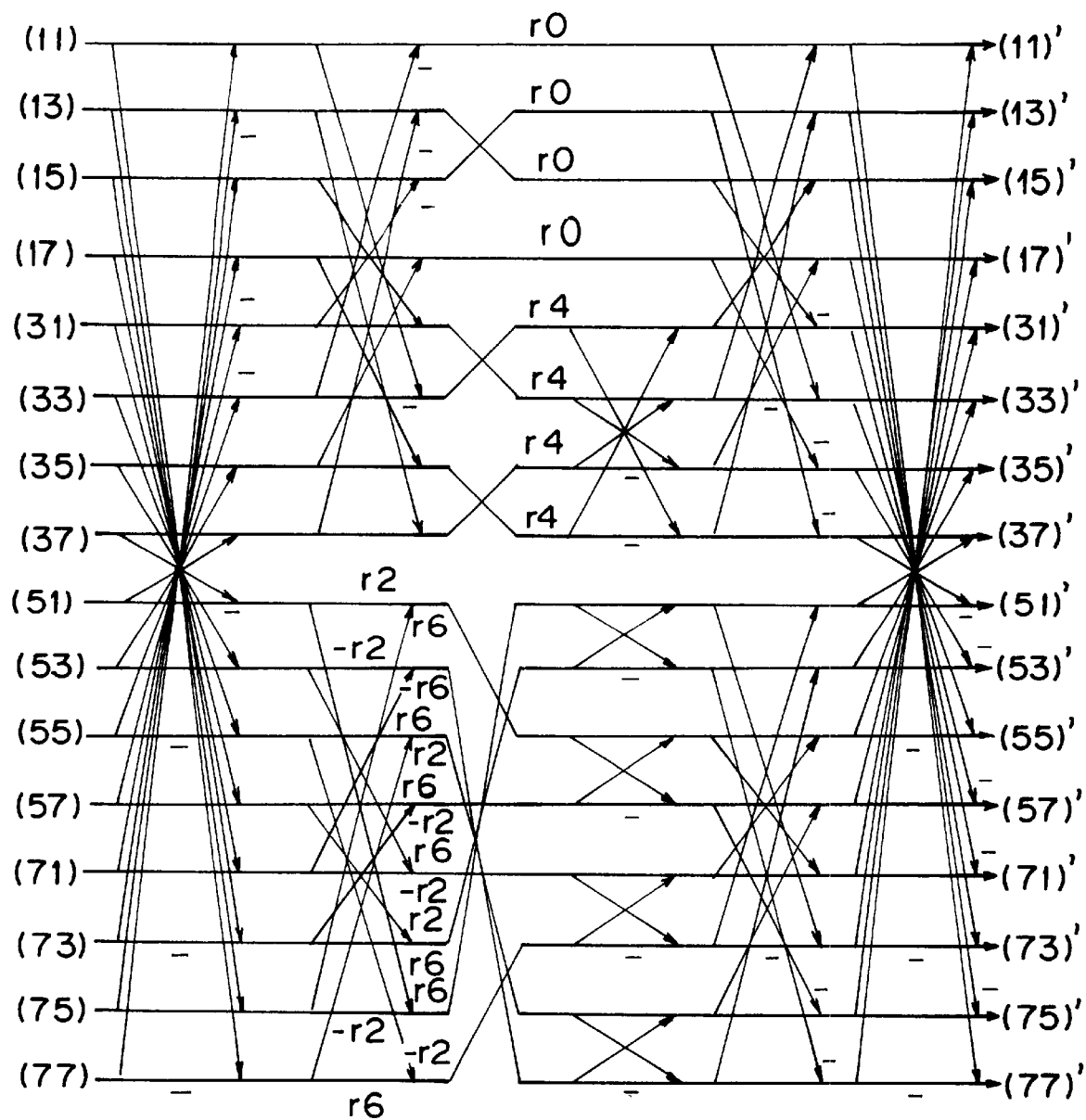

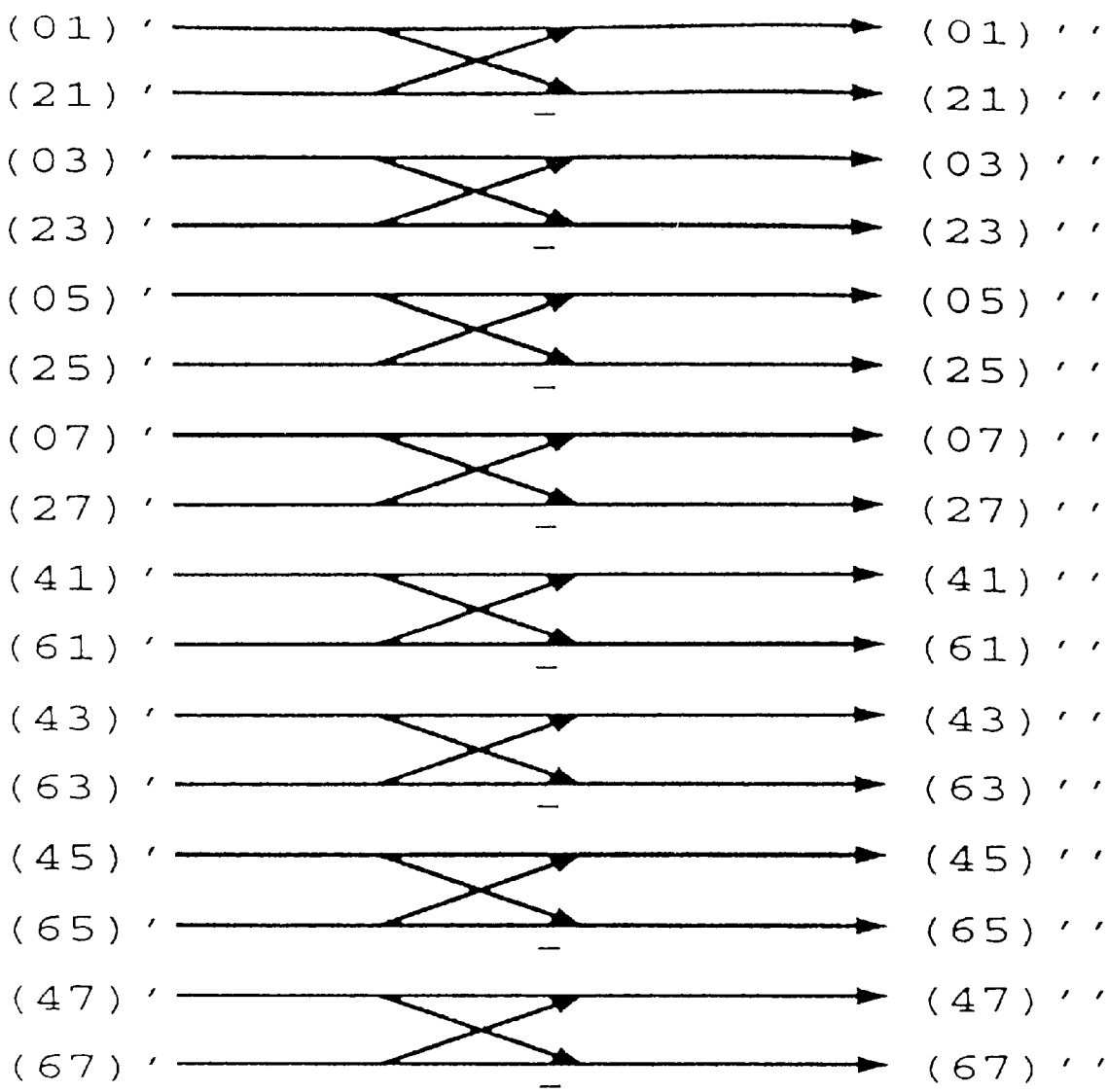
F I G.15

FIG. 27

|   | 0 | 1 | 2 | 3 | 4 | 5 | 6 | 7 |
|---|---|---|---|---|---|---|---|---|
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| 7 | 35 | 36 | 48 | 49 | 57 | 58 | 62 | 63 |

FIG. 28

|     | 0  4 | 2  6 | 1  3  5  7 |
|-----|------|------|------------|
| 0 4 | TENSOR PRODUCT CALCULATION 10 | TENSOR PRODUCT CALCULATION 11 | TENSOR PRODUCT CALCULATION 14 |
| 2 6 | TENSOR PRODUCT CALCULATION 12 | TENSOR PRODUCT CALCULATION 13 | TENSOR PRODUCT CALCULATION 15 |
| 1 3 5 7 | TENSOR PRODUCT CALCULATION 16 | TENSOR PRODUCT CALCULATION 17 | TENSOR PRODUCT CALCULATION 18 |

FIG. 29

| | 0 | 4 | 2 | 6 | 1 | 3 | 5 | 7 |
|---|---|---|---|---|---|---|---|---|
| 0 | 0 | 14 | 5 | 27 | 1 | 6 | 15 | 28 |
| 4 | 10 | 39 | 23 | 52 | 19 | 32 | 45 | 54 |
| 2 | 3 | 25 | 12 | 41 | 8 | 17 | 30 | 43 |
| 6 | 21 | 50 | 37 | 59 | 34 | 47 | 56 | 61 |
| 1 | 2 | 16 | 7 | 29 | 4 | 13 | 26 | 42 |
| 3 | 9 | 31 | 18 | 44 | 11 | 24 | 40 | 53 |
| 5 | 20 | 46 | 33 | 55 | 22 | 38 | 51 | 60 |
| 7 | 35 | 57 | 48 | 62 | 36 | 49 | 58 | 63 |

TWO-DIMENSIONAL INVERSE-DISCRETE COSINE TRANSFORM CIRCUIT

BACKGROUND OF THE INVENTION

1. Field of the Invention

The present invention relates to a two-dimensional inverse discrete cosine transform circuit and, in particular, to a circuit that accomplishes a two-dimensional inverse discrete cosine transform (IDCT) suitable for processing a picture signal.

2. Description of the Related Art

Because of improvement of microprocessors and signal processors in recent years, picture signals have been processed on real time basis with these microprocessors and signal processors.

In a microprocessor that has multiplying units and sum-of-product calculating units, a sum-of-product calculation can be accomplished with the same number of clock pulses as an addition/subtraction. Thus, for increasing the speed of the process, it is desired to decrease the total of the number of additions/subtractions in spite of to decrease merely the number of sum-of-product calculations.

When a two-dimensional DCT or a two-dimensional IDCT is accomplished by a microprocessor or a signal processor, due to the restriction of the number of internal registers, one-dimensional (I)DCTs are calculated in line direction and the calculated results are temporarily stored in an external memory. Next, the calculated results in the line direction are read in row direction so as to perform one-dimensional (I)DCTs in the row direction.

At this point, for preventing the number of calculations and the amount of hardware from increasing, the calculated results in the line direction are stored as single-precision data in the external memory. Thus, a calculation error takes place. A method for suppressing both such a calculation error and the total of the number of sum-of-product calculations and additions/subtractions is described in, for example, "A Study of High-Speed Calculations of Two-Dimensional (I)DCT," Proceedings Fundamental/Boundary Society Convention, pp. 88A–86, Vol. 1, 1995, The Institute of Electronics, Information and Communication Engineers, Japan.

FIG. 30 is a block diagram showing a two-dimensional IDCT (Inverse Discrete Cosine Transform) circuit proposed in the above-described proceedings.

Tensor product calculating units 10 to 18 receive data with addresses shown in FIG. 30. Referring to FIG. 30, it is assumed that indexes i and j are an integer ranging from 0 to 7 and that a transform coefficient of eight-point×eight-point two-dimensional discrete cosine transform is expressed by (ij) where i is an address in the vertical direction and j is an address in the horizontal direction. The first tensor product calculating unit 10 receives (00), (04), (40), and (44). The second tensor product calculating unit 11 receives (02), (06), (42), and (46). The third tensor product calculating unit 12 receives (20), (24), (60), and (64). The fourth tensor product calculating unit 13 receives (22), (26), (62), and (66). The fifth tensor product calculating unit 14 receives (01), (03), (05), (07), (41), (43), (45), and (47). The sixth tensor product calculating unit 15 receives (21), (23), (25), (27), (61), (63), (65), and (67). The seventh tensor product calculating unit 16 receives (10), (14), (30), (34), (50), (54), (70), and (74). The eighth tensor product calculating unit 17 receives (12), (16), (32), (36), (52), (56), (72), and (76). The ninth tensor product calculating unit 18 receives (11), (13), (15), (17), (31), (33), (35), (37), (51), (53), (55), (57), (71), (73), (75), and (77).

A first two-dimensional butterfly calculating unit 19 receives calculated results of the first to fourth tensor product calculating units 10 to 13 and performs a four-point×four-point two-dimensional butterfly calculation for the received data. A first one-dimensional butterfly calculating unit 20 receives calculated results of the fifth and sixth tensor product calculating units 14 and 15 and performs a 16-point one-dimensional butterfly calculation for the received data. A second one-dimensional butterfly calculating unit 21 receives calculated results of the seventh and eighth tensor product calculating units 16 and 17 and performs a 16-point one-dimensional butterfly calculation for the received data.

A second two-dimensional butterfly calculating unit 22 receives calculated results of the first two-dimensional butterfly calculating unit 19, the first and second one-dimensional butterfly calculating units 20 and 21, and the ninth tensor product calculating unit 18 and performs an eight-point×eight-point two-dimensional butterfly calculation for the received data.

With reference to FIG. 30, when all of the received data of each of the first to ninth tensor product calculating units 10 to 18 are zero data, all of the output data thereof are zero data. However, in the conventional method, all of the tensor product calculations are performed regardless of whether the input data are zero data or non-zero data. Thus, the number of calculations in the case that the received data are zero data is the same as the number of calculations in the case that the received data are non-zero data.

SUMMARY OF THE INVENTION

An object of the present invention is to provide a two-dimensional inverse discrete cosine transform circuit in which the amount of calculations and the operation time are reduced when there are zero data in input data.

In order to accomplish the above-described object, a first aspect of the present invention is to provide a two-dimensional inverse discrete cosine transform circuit, comprising a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction, a second tensor product calculating unit for receiving (02), (06), (42), and (46) as transform coefficients, a third tensor product calculating unit for receiving (20), (24), (60), and (64) as transform coefficients, a fourth tensor product calculating unit for receiving (22), (26), (62), and (66) as transform coefficients, a fifth tensor product calculating unit for receiving (01), (03), (05), (07), (41), (43), (45), and (47) as transform coefficients, a sixth tensor product calculating unit for receiving (21), (23), (25), (27), (61), (63), (65), and (67) as transform coefficients, a seventh tensor product calculating unit for receiving (10), (14), (30), (34), (50), (54), (70), and (74) as transform coefficients, an eighth tensor product calculating unit for receiving (12), (16), (32), (36), (52), (56), (72), and (76) as transform coefficients, a ninth tensor product calculating unit for receiving (11), (13), (15), (17), (31), (33), (35), (37), (51), (53), (55), (57), (71), (73), (75), and (77) as transform coefficients, a first two-dimensional butterfly calculating unit for receiving calculated results of the first to forth tensor product calculating units, a first one-dimensional butterfly calculating unit for receiving calculated results of the fifth and sixth tensor product calculating units, a second one-dimensional butterfly calculating unit for receiving calculated results of the seventh and eighth tensor product calculating units, a second two-dimensional butterfly calculating unit for receiving a calculated result of the first two-dimensional butterfly calculating unit, calculated results of the first and second one-dimensional butterfly calculating units, and a calculated result of the ninth tensor product calculating unit, and first to ninth determining units for receiving input data of the first to ninth tensor product calculating units, respectively, wherein the first to ninth determining units determine whether received data thereof have non-zero data and send the determined results to the relevant tensor product calculating units, and wherein the first to ninth tensor product calculating units do not perform tensor product calculations when the first to ninth determining units have determined that all of the received data are zero data, respectively.

A second aspect of the present invention is to provide a two-dimensional inverse discrete cosine transform circuit, comprising a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction, a second tensor product calculating unit for receiving (02), (06), (42), and (46) as transform coefficients, a third tensor product calculating unit for receiving (20), (24), (60), and (64) as transform coefficients, a fourth tensor product calculating unit for receiving (22), (26), (62), and (66) as transform coefficients, a fifth tensor product calculating unit for receiving (01), (03), (05), (07), (41), (43), (45), and (47) as transform coefficients, a sixth tensor product calculating unit for receiving (21), (23), (25), (27), (61), (63), (65), and (67) as transform coefficients, a seventh tensor product calculating unit for receiving (10), (14), (30), (34), (50), (54), (70), and (74) as transform coefficients, an eighth tensor product calculating unit for receiving (12), (16), (32), (36), (52), (56), (72), and (76) as transform coefficients, a ninth tensor product calculating unit for receiving (11), (13), (15), (17), (31), (33), (35), (37), (51), (53), (55), (57), (71), (73), (75), and (77) as transform coefficients, a first two-dimensional butterfly calculating unit for receiving calculated results of the first to fourth tensor product calculating units, a first one-dimensional butterfly calculating unit for receiving calculated results of the fifth and sixth tensor product calculating units, a second one-dimensional butterfly calculating unit for receiving calculated results of the seventh and eighth tensor product calculating units, a second two-dimensional butterfly calculating unit for receiving a calculated result of the first two-dimensional butterfly calculating unit, calculated results of the first and second one-dimensional butterfly calculating units, and a calculated result of the ninth tensor product calculating unit, first to ninth partial tensor product calculating units for performing tensor product calculations with a predetermined part of received data of the first to ninth tensor product calculating units, and first to ninth selecting units for receiving input data of the first to ninth tensor product calculating units, wherein the first to ninth selecting units determine whether or not received data thereof other than received data of the first to ninth partial tensor product calculating unit have non-zero data, and sends the determined results to the relevant tensor product calculating units and the relevant partial tensor product calculating units, wherein the relevant tensor product calculating units perform tensor product calculations when the received data other than received data of the relevant partial tensor product calculating units have non-zero data, and wherein the relevant partial tensor product calculating units perform partial tensor product calculations and substitutes supplied data of the relevant tensor product calculating units with supplied data of the relevant partial tensor product calculating units when all of the received data other than received data of the relevant partial tensor product calculating units are zero data.

A third aspect of the present invention is to provide a two-dimensional inverse discrete cosine transform circuit, comprising a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, i being an address in horizontal direction, a second tensor product calculating unit for receiving (02), (06), (42), and (46) as transform coefficients, a third tensor product calculating unit for receiving (20), (24), (60), and (64) as transform coefficients, a fourth tensor product calculating unit for receiving (22), (26), (62), and (66) as transform coefficients, a fifth tensor product calculating unit for receiving (01), (03), (05), (07), (41), (43), (45), and (47) as transform coefficients, a sixth tensor product calculating unit for receiving (21), (23), (25), (27), (61), (63), (65), and (67) as transform coefficients, a seventh tensor product calculating unit for receiving (10), (14), (30), (34), (50), (54), (70), and (74) as transform coefficients, an eighth tensor product calculating unit for receiving (12), (16), (32), (36), (52), (56), (72), and (76) as transform coefficients, a ninth tensor product calculating unit for receiving (11), (13), (15), (17), (31), (33), (35), (37), (51), (53), (55), (57), (71), (73), (75), and (77) as transform coefficients, a first two-dimensional butterfly calculating unit for receiving calculated results of the first to forth tensor product calculating units, a first one-dimensional butterfly calculating unit for receiving calculated results of the fifth and sixth tensor product calculating units, a second one-dimensional butterfly calculating unit for receiving calculated results of the seventh and eighth tensor product calculating units, a second two-dimensional butterfly calculating unit for receiving a calculated result of the first two-dimensional butterfly calculating unit, calculated results of the first and second one-dimensional butterfly calculating units, and a calculated result of the ninth tensor product calculating unit, and first to eighth determining units corresponding to the second to ninth tensor product calculating units, respectively, wherein the first to eighth determining units receive position information of end-of-block (EOB) code, treat DCT coefficients ranging from coefficient (00) to EOB code as non-zero data, determine whether or not received data of the relevant tensor product calculating units have non-zero data, and send the determined results to the relevant tensor product calculating units, and wherein the relevant tensor product calculating units do not perform tensor product calculations when the relevant determining units have determined that all of the received data are zero data.

A fourth aspect of the present invention is to provide a two-dimensional inverse discrete cosine transform circuit, comprising a first tensor product calculating unit for receiving (00), (04), (40), and (44) as transform coefficients (ij) of an eight-point×eight-point two-dimensional discrete cosine transform (DCT) where i and j are an integer ranging from 0 to 7, i being an address in vertical direction, j being an address in horizontal direction, a second tensor product calculating unit for receiving (02), (06), (42), and (46) as transform coefficients, a third tensor product calculating unit for receiving (20), (24), (60), and (64) as transform coefficients, a fourth tensor product calculating unit for receiving (22), (26), (62), and (66) as transform coefficients, a fifth tensor product calculating unit for receiving (01), (03), (05), (07), (41), (43), (45), and (47) as transform coefficients, a sixth tensor product calculating unit for receiving (21), (23), (25), (27), (61), (63), (65), and (67) as transform coefficients, a seventh tensor product calculating unit for receiving (10), (14), (30), (34), (50), (54), (70), and (74) as transform coefficients, an eighth tensor product calculating unit for receiving (12), (16), (32), (36), (52), (56), (72), and (76) as transform coefficients, a ninth tensor product calculating unit for receiving (11), (13), (15), (17), (31), (33), (35), (37), (51), (53), (55), (57), (71), (73), (75) and (77) as transform coefficients, a first two-dimensional butterfly calculating unit for receiving calculated results of the first to fourth tensor product calculating units, a first one-dimensional butterfly calculating unit for receiving calculated results of the fifth and sixth tensor product calculating units, a second one-dimensional butterfly calculating unit for receiving calculated results of the seventh and eighth tensor product calculating units, a second two-dimensional butterfly calculating unit for receiving a calculated result of the first two-dimensional butterfly calculating unit, calculated results of the first and second one-dimensional butterfly calculating units, and a calculated result of the ninth tensor product calculating unit, first to ninth partial tensor product calculating units for performing tensor product calculations with a predetermined part of received data of the first to ninth tensor product calculating units, and first to ninth selecting units corresponding to the first to ninth tensor product calculating units, respectively, wherein the first to ninth selecting units receive position information of end-of-block (EOB) code of the received DCT coefficients, treat DCT coefficients ranging from coefficient (00) to EOB code as non-zero data, determine whether or not received data of the relevant tensor product calculating units other than received data of the relevant partial tensor product calculating units have non-zero data, and send the determined results to the relevant tensor product calculating units and the relevant partial tensor product calculating units, wherein the relevant tensor product calculating units perform tensor product calculations when the received data other than the received data of the relevant partial tensor product calculating units have non-zero data, and wherein the relevant partial tensor product calculating units perform partial tensor product calculations and substitute supplied data of the relevant tensor product calculating units with supplied data of the relevant partial tensor product calculating units when the received data other than the received data do not have non-zero data.

MODES OF EMBODIMENT OF THE INVENTION

With reference to FIG. 1, the first to ninth tensor product calculating units 10 to 18 are disposed. First to ninth determining units 1 to 9 are disposed corresponding to the first to ninth tensor product calculating units 10 to 18. Input data of the first to ninth tensor product calculating units 10 to 18 are also input data of the first to ninth determining units 1 to 9. The first to ninth determining units 1 to 9 determine whether or not respective received data have non-zero data, and supply the determined results to the first to ninth tensor product calculating units 10 to 18, respectively. When the first to ninth determining units 1 to 9 have determined that all of the received data are zero data, the first to ninth tensor product calculating units 10 to 18 do not perform tensor product calculations.

Thus, according to the first aspect of the present invention, since the tensor product calculations are not performed in the case that all of the received data are zero data, although the calculations of the determining portions are required, when the tensor product calculations are applied for encoding a picture signal, the average number of calculations can be reduced.

According to the second aspect of the present invention, with reference to FIG. 2, first to ninth partial tensor product calculating units 32 to 40 are disposed. The first to ninth partial tensor product calculating units 32 to 40 perform tensor product calculations for a predetermined part of input data of first to ninth tensor product calculating units 10 to 18. In addition, first to ninth selecting units 23 to 31 are disposed. Input data of the first to ninth selecting units 23 to 31 are the same as input data of the first to ninth tensor product calculating units 10 to 18. The first to ninth selecting units 23 to 31 determine whether or not there are non-zero data in received data of first to ninth tensor product calculating units 10 to 18 other than received data of the first to ninth partial tensor product calculating units 32 to 40 respectively, and supply the determined results to the relevant tensor product calculating units and the relevant partial tensor product calculating units. When there are non-zero data in received data of first to ninth tensor product calculating units 10 to 18 other than the received data of the partial tensor product calculating unit 32 to 40 respectively, the tensor product calculating units 10 to 18 perform tensor product calculations. When all of the data other than the received data of the partial tensor product calculating units 32 to 40 are zero data, the partial tensor product calculating units perform partial tensor product calculations instead of the tensor product calculating units and supply the calculated results as tensor product calculations.

According to the second aspect of the present invention, tensor product calculations or partial tensor product calculations are selectively performed corresponding to the combination of zero data or non-zero data. There is a case that a partial tensor product calculator calculates the partial tensor product instead of a tensor product calculator, even if there are non-zero data in the input of tensor product calculator. Thus, the average number of calculations of the second aspect of the present invention can be more reduced than that of the first aspect of the present invention.

With reference to FIG. 3, according to the third aspect of the present invention, first to eighth determining units 41 to 48 are disposed corresponding to second to ninth tensor product calculating units 11 to 18, respectively. The first to eighth determining units 41 to 48 receive position information of end-of-block (EOB) code, treat DCT coefficients ranging from coefficient (00) to EOB code as non-zero data, determine whether or not received data of the relevant tensor product calculating units have non-zero data, and send the determined results to the relevant tensor product calculating units. When all of the received data are zero data, the tensor product calculating units do not perform tensor product calculations.

According to the third aspect of the present invention, assuming that received data ranging from coefficient (00) to EOB code are regarded as non-zero data, the determining units 41 to 48 determine whether to cause the tensor product calculating units to perform tensor product calculations. Thus, the determining units 41 to 48 do not need to determine whether each of the received data of the tensor product calculating units is zero data or non-zero data. Consequently, the number of calculations in the determining units is reduced.

Next, according to the fourth aspect of the present invention, with reference to FIG. 4, first to ninth selecting units 49 to 57 are disposed corresponding to first to ninth tensor product calculating units 10 to 18. The first to ninth selecting units 49 to 57 receive position information of end-of-block (EOB) code of received DCT coefficients, treat DCT coefficients ranging from coefficient (00) to EOB code as non-zero data determine whether or not there are non-zero data in received data of first to ninth tensor product calculating units 10 to 18 other than received data of partial tensor product calculating units 32 to 40 respectively, and send the determined results to the relevant tensor product calculating units and the relevant partial tensor product calculating units. When there are non-zero data in the received data other than the input of the partial tensor calculating unit, the tensor product calculating units perform tensor product calculations. When there are not non-zero data in received data other than the input of the partial tensor calculating unit, the partial tensor product calculating units perform partial tensor product calculations and substitute output data of the tensor product calculating units with output data of the partial tensor product calculating units.

According to the fourth aspect of the present invention, assuming that all of the received data ranging from coefficient (00) to EOB code are regarded as non-zero data, the selecting units select tensor product calculations or partial tensor product calculations. Thus, it is not necessary to determine whether each of the input data of tensor product calculations other than input data of partial tensor product calculations is zero data or non-zero data. Thus, the number of calculations in selecting portions is reduced.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 is a schematic diagram showing signal flow in a tensor product calculating unit 15 according to an embodiment of the present invention;

FIG. 12 is a schematic diagram showing signal flow in a tensor product calculating unit 17 according to an embodiment of the present invention;

FIG. 13 is a schematic diagram showing signal flow in a tensor product calculating unit 18 according to an embodiment of the present invention;

FIG. 15 is a schematic diagram showing signal flow in a one-dimensional butterfly calculating unit 20 according to an embodiment of the present invention;

FIG. 27 is a schematic diagram showing numbers of received DCT coefficients according to an embodiment of the present invention;

FIG. 28 is a first schematic diagram showing relation between tensor product calculations and positions of received DCT coefficients;

FIG. 29 is a second schematic diagram showing relation between tensor product calculations and positions of received DCT coefficients.

DESCRIPTION OF PREFERRED EMBODIMENTS

Next, embodiments of the present invention will be described in detail.

Figure 1:
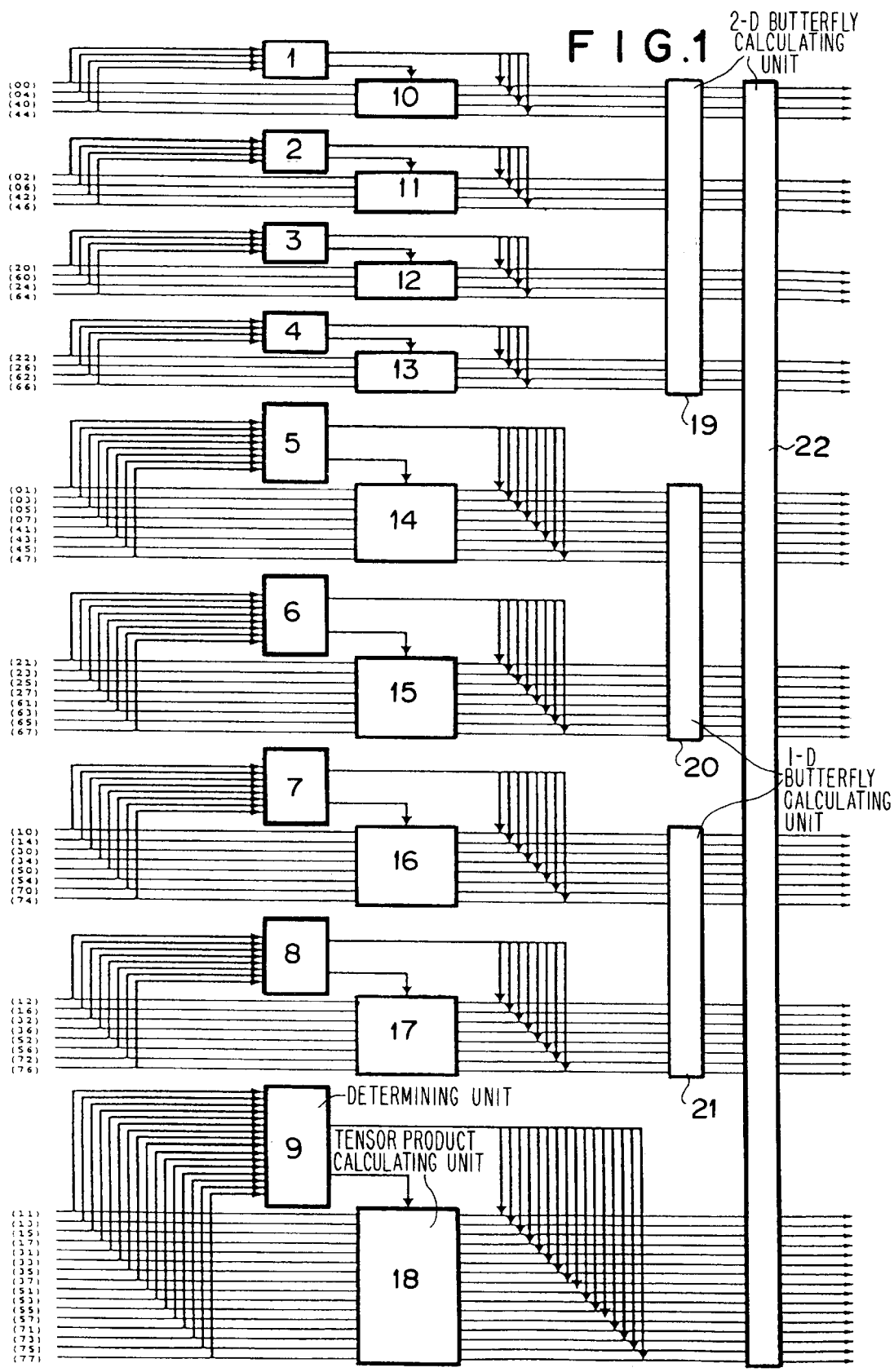
FIG. 1 is a block diagram showing the structure of a first embodiment of the present invention.

FIG. 1 is a block diagram showing the structure of the first embodiment of the present invention. In an eight-point× eight-point two-dimensional IDCT circuit according to the embodiments of the present invention that follow, a received DCT coefficient is represented by (ij) where indexes i and j are an integer ranging from 0 to 7, index i represents an address in the vertical direction, and index j represents an address in the horizontal direction.

With reference to FIG. 1, according to the first embodiment, first to ninth tensor product calculating units 10 to 18 are disposed. First to ninth determining units 1 to 9 are disposed corresponding to the first to ninth tensor product calculating units 10 to 18, respectively. The first to ninth determining units 1 to 9 determine whether received data of the first to ninth tensor product calculating units 10 to 18 are zero data or non-zero data.

The first determining unit 1 determines whether or not received data (00), (04), (40), and (44) are zero data. When at least one of the received data (00), (04), (40), and (44) is non-zero data, the first tensor product calculating unit 10 performs a tensor product calculation. When all of the received data are zero data, the first tensor product calculating unit 10 does not perform a tensor product calculation.

The second determining unit 2 determines whether or not received data (02), (06), (42), and (46) are zero data. When at least one of the received data (02), (06), (42), and (46) is non-zero data, the second tensor product calculating unit 11 performs a tensor product calculation. When all of the received data are zero data, the second tensor product calculating unit 11 does not perform a tensor product calculation.

The third determining unit 3 determines whether or not received data (20), (24), (60), and (64) are zero data. When at least one of the received data (20), (24) and (60), and (64) is non-zero data, the third tensor product calculating unit 12 performs a tensor product calculation. When all of the received data are zero data, the third tensor product calculating unit 12 does not perform a tensor product calculation.

The fourth determining unit 4 determines whether or not received data (22), (26), (62), and (66) are zero data. When at least one of the received data (22), (26), (62), and (66) is non-zero data, the fourth tensor product calculating unit 13 performs a tensor product calculation. When all of the received data are zero data, the fourth tensor product calculating unit 13 does not perform a tensor product calculation.

The fifth determining unit 5 determines whether or not received data (01), (03), (05), (07), (41), (43), (45), and (47) are zero data. When at least one of the received data (01), (03), (05), (07), (41), (43), (45), and (47) is non-zero data, the fifth tensor product calculating unit 14 performs a tensor product calculation. When all of the received data are zero data, the fifth tensor product calculating unit 14 does not perform a tensor product calculation.

The sixth determining unit 6 determines whether or not received data (21), (23), (25), (27), (61), (63), (65), and (67) are zero data. When at least one of the received data (21), (23), (25), (27), (61), (63), (65), and (67) is non-zero data, the sixth tensor product calculating unit 15 performs a tensor product calculation. When all of the received data are zero data, the sixth tensor product calculating unit 15 does not perform a tensor product calculation.

The seventh determining unit 7 determines whether or not received data (10), (14), (30), (34), (50), (54), (70), and (74) are zero data. When at least one of the received data (10), (14), (30), (34), (50), (54), (70), and (74) is non-zero data, the seventh tensor product calculating unit 16 performs a tensor product calculation. When all of the received data are zero data, the seventh tensor product calculating unit 16 does not perform a tensor product calculation.

The eighth determining unit 8 determines whether or not received data (12), (16), (32), (36), (52), (56), (72), and (76) are zero data. When at least one of the received data (12), (16), (32), (36), (52), (56), (72), and (76) is non-zero data, the eighth tensor product calculating unit 17 performs a tensor product calculation. When all of the received data are zero data, the eighth tensor product calculating unit 17 does not perform a tensor product calculation.

The ninth determining unit 9 determines whether or not received data (11), (13), (15), (17), (31), (33), (35), (37), (51), (53), (55), (57), (71), (73), (75), and (77) are zero data. When at least one of the received data (11), (13), (15), (17), (31), (33), (35), (37), (51), (53), (55), (57), (71), (73), (75), and (77) is non-zero data, the ninth tensor product calculating unit 18 performs a tensor product calculation. When all of the received data are zero data, the ninth tensor product calculating unit 18 does not perform a tensor product calculation.

The first to ninth tensor product calculating units 10 to 18 receive the determined results of the first to ninth determining units 1 to 9, respectively. Only when the determining units have determined the necessity of tensor product calculations, the first to ninth tensor product calculating units 10 to 18 perform tensor product calculations.

Assuming $C_{uv}$ is expressed, $$C_{uv} = \cos\left[\frac{2\pi u}{32}\right] \cdot \cos\left[\frac{2\pi v}{32}\right]$$

The first tensor product calculating unit 10 receives DCT coefficients (00), (04), (40), and (44) and perform a 4×4 matrix vector calculation expressed by the formula (1) for the DCT coefficients (00), (04), (40), and (44).

$$\begin{bmatrix} C_{44} & C_{44} & C_{44} & C_{44} \\ C_{44} & -C_{44} & C_{44} & -C_{44} \\ C_{44} & C_{44} & -C_{44} & -C_{44} \\ C_{44} & -C_{44} & -C_{44} & C_{44} \end{bmatrix} \quad (1)$$

The second tensor product calculating unit 11 receives DCT coefficients (02), (06), (42), and (46) and perform a 4×4 matrix vector calculation expressed by the formula (2) for the DCT coefficients (02), (06), (42), and (46).

$$\begin{bmatrix} C_{42} & C_{46} & C_{42} & C_{46} \\ C_{46} & -C_{42} & C_{46} & -C_{42} \\ C_{42} & C_{46} & -C_{42} & -C_{46} \\ C_{46} & -C_{42} & -C_{46} & C_{42} \end{bmatrix} \quad (2)$$

The third tensor product calculating unit 12 receives DCT coefficients (20), (24), (60), and (64) and perform a 4×4 matrix vector calculation expressed by the formula (3) for the DCT coefficients (20), (24), (60), and (64).

$$\begin{bmatrix} C_{24} & C_{24} & C_{64} & C_{64} \\ C_{24} & -C_{24} & C_{64} & -C_{64} \\ C_{64} & C_{64} & -C_{24} & -C_{24} \\ C_{64} & -C_{64} & -C_{24} & C_{24} \end{bmatrix} \quad (3)$$

The fourth tensor product calculating unit 13 receives DCT coefficients (22), (26), (62), and (66) and perform a 4×4 matrix vector calculation expressed by the formula (4) for the DCT coefficients (22), (26), (62), and (66).

$$\begin{bmatrix} C_{22} & C_{26} & C_{62} & C_{66} \\ C_{26} & -C_{22} & C_{66} & -C_{62} \\ C_{62} & C_{66} & -C_{22} & -C_{26} \\ C_{66} & -C_{62} & -C_{26} & C_{22} \end{bmatrix} \quad (4)$$

The fifth tensor product calculating unit 14 receives DCT coefficients (01), (03), (05), (07), (41), (43), (45), and (47) and perform an 8×8 matrix vector calculation expressed by the formula (5) for the DCT coefficients (01), (03), (05), (07), (41), (43), (45), and (47).

$$\begin{bmatrix} C_{41} & C_{43} & C_{45} & C_{47} & C_{41} & C_{43} & C_{45} & C_{47} \\ C_{43} & -C_{47} & -C_{41} & -C_{45} & C_{43} & -C_{47} & -C_{41} & -C_{45} \\ C_{45} & -C_{41} & C_{47} & C_{43} & C_{45} & -C_{41} & C_{47} & C_{43} \\ C_{47} & -C_{45} & C_{43} & -C_{41} & C_{47} & -C_{45} & C_{43} & -C_{41} \\ C_{41} & C_{43} & C_{45} & C_{47} & -C_{41} & -C_{43} & -C_{45} & -C_{47} \\ C_{43} & -C_{47} & -C_{41} & -C_{45} & -C_{43} & C_{47} & C_{41} & C_{45} \\ C_{45} & -C_{41} & C_{47} & C_{43} & -C_{45} & C_{41} & -C_{47} & -C_{43} \\ C_{47} & -C_{45} & C_{43} & -C_{41} & -C_{47} & C_{45} & -C_{43} & C_{41} \end{bmatrix} \quad (5)$$

The sixth tensor product calculating unit 15 receives DCT coeficients (21), (23), (25), (27), (61), (63), (65), and (47) and perform an 8×8 matrix vector calculation expressed by the formula (6) for the DCT coefficients (21), (23), (27), (61), (63), (65), and (67).

$$\begin{bmatrix} C_{21} & C_{23} & C_{25} & C_{27} & C_{61} & C_{63} & C_{65} & C_{67} \\ C_{23} & -C_{27} & -C_{21} & -C_{25} & C_{63} & -C_{67} & -C_{61} & -C_{65} \\ C_{25} & -C_{21} & C_{27} & C_{23} & C_{65} & -C_{61} & C_{67} & C_{63} \\ C_{27} & -C_{25} & C_{23} & -C_{21} & C_{67} & -C_{65} & C_{63} & -C_{61} \\ C_{61} & C_{63} & C_{65} & C_{67} & -C_{21} & -C_{23} & -C_{25} & -C_{27} \\ C_{63} & -C_{65} & -C_{61} & -C_{65} & -C_{23} & C_{27} & C_{21} & C_{25} \\ C_{65} & -C_{61} & C_{67} & C_{63} & -C_{25} & C_{21} & -C_{27} & -C_{23} \\ C_{67} & -C_{65} & C_{63} & -C_{61} & -C_{27} & C_{25} & -C_{23} & C_{21} \end{bmatrix} \quad (6)$$

The seventh tensor product calculating unit 16 receives DCT coefficients (10), (14), (30), (34), (50), (54), (70) and (74) and perform an 8×8 matrix vector calculation expressed by the formula (7) for the DCT coefficients (10), (14), (30), (34), (50), (54), (70), and (74).

$$\begin{bmatrix} C_{14} & C_{14} & C_{34} & C_{34} & C_{54} & C_{54} & C_{74} & C_{74} \\ C_{14} & -C_{14} & C_{34} & -C_{34} & C_{54} & -C_{54} & C_{74} & -C_{74} \\ C_{34} & C_{34} & -C_{77} & -C_{74} & -C_{14} & -C_{14} & -C_{54} & -C_{54} \\ C_{34} & -C_{34} & -C_{74} & C_{74} & -C_{14} & C_{14} & -C_{54} & C_{54} \\ C_{54} & C_{54} & -C_{14} & -C_{14} & C_{74} & C_{74} & C_{34} & C_{34} \\ C_{54} & -C_{54} & -C_{14} & C_{14} & C_{74} & -C_{74} & C_{34} & -C_{34} \\ C_{74} & C_{74} & -C_{54} & -C_{54} & C_{34} & C_{34} & -C_{14} & -C_{14} \\ C_{74} & -C_{74} & -C_{54} & C_{54} & C_{34} & -C_{34} & -C_{14} & C_{14} \end{bmatrix} \quad (7)$$

The eighth tensor product calculating unit 17 receives DCT coefficients (12), (16), (32), (36), (52), (56), (72), and (76) and perform an 8×8 matrix vector calculation expressed by the formula (8) for the DCT coefficients (12), (16), (32), (36), (52), (56), (72), and (76).

$$\begin{bmatrix} C_{12} & C_{16} & C_{32} & C_{36} & C_{52} & C_{56} & C_{72} & C_{76} \\ C_{16} & -C_{12} & C_{36} & -C_{32} & C_{56} & -C_{52} & C_{76} & -C_{72} \\ C_{32} & C_{36} & -C_{72} & -C_{76} & -C_{12} & -C_{16} & -C_{52} & -C_{56} \\ C_{36} & -C_{32} & -C_{76} & C_{72} & -C_{16} & C_{12} & -C_{56} & C_{52} \\ C_{52} & C_{56} & -C_{12} & -C_{16} & C_{72} & C_{76} & C_{32} & C_{36} \\ C_{56} & -C_{52} & -C_{16} & C_{12} & C_{76} & -C_{72} & C_{36} & -C_{32} \\ C_{72} & C_{76} & -C_{52} & -C_{56} & C_{32} & C_{36} & -C_{12} & -C_{16} \\ C_{76} & -C_{72} & -C_{56} & C_{52} & C_{36} & -C_{32} & -C_{16} & C_{12} \end{bmatrix} \quad (8)$$

The ninth tensor product calculating unit 18 receives DCT coefficients (11), (13), (15), (17), (31), (33), (35), (37), (51), (53), (55), (57), (71), (73), (75), and (77) and perform a 16×16 matrix vector calculation expressed by the formula (9) for the DCT coefficients (11), (13), (15), (17), (31), (33), (35), (37), (51), (53), (55), (57), (71), (73), (75), and (77).

$$\begin{bmatrix} C11 & C13 & C15 & C17 & C31 & C33 & C35 & C37 & C51 & C53 & C55 & C57 & C71 & C73 & C75 & C77 \\ C13 & -C17 & -C11 & -C15 & C33 & -C37 & -C31 & -C35 & C53 & -C57 & -C51 & -C55 & C73 & -C77 & -C71 & -C75 \\ C15 & -C11 & C17 & C13 & C35 & -C31 & C37 & C33 & C55 & -C51 & C57 & C53 & C75 & -C71 & C77 & C73 \\ C17 & -C15 & C13 & -C11 & C37 & -C35 & C33 & -C31 & C57 & -C55 & C53 & -C51 & C77 & -C75 & C73 & -C71 \\ C31 & C33 & C35 & C37 & -C71 & -C73 & -C75 & -C77 & -C11 & -C13 & -C15 & -C17 & -C51 & -C53 & -C55 & -C57 \\ C33 & -C37 & -C31 & -C35 & -C73 & C77 & C71 & C75 & -C13 & C17 & C11 & C15 & -C53 & C57 & C51 & C55 \\ C35 & -C31 & C37 & C33 & -C75 & C71 & -C77 & -C73 & -C15 & C11 & -C17 & -C13 & -C55 & C51 & -C57 & -C53 \\ C37 & -C35 & C33 & -C31 & -C77 & C75 & -C73 & C71 & -C17 & C15 & -C13 & C11 & -C57 & C55 & -C53 & C51 \\ C51 & C53 & C55 & C57 & -C11 & -C13 & -C15 & -C17 & C71 & C73 & C75 & C77 & C31 & C33 & C35 & C37 \\ C53 & -C57 & -C51 & -C55 & -C13 & C17 & C11 & C15 & C73 & -C77 & -C71 & -C75 & C33 & -C37 & -C31 & -C35 \\ C55 & -C51 & C57 & C53 & -C15 & C11 & -C17 & -C13 & C75 & -C71 & C77 & C73 & C35 & -C31 & C37 & C33 \\ C57 & -C55 & C53 & -C51 & -C17 & C15 & -C13 & C11 & C77 & -C75 & C73 & -C71 & C37 & -C35 & C33 & -C31 \\ C71 & C73 & C75 & C77 & -C51 & -C53 & -C55 & -C57 & C31 & C33 & C35 & C37 & -C11 & -C13 & -C15 & -C17 \\ C73 & -C77 & -C71 & -C75 & -C53 & C57 & C51 & C55 & C33 & -C37 & -C31 & -C35 & -C13 & C17 & C11 & C15 \\ C75 & -C71 & C77 & C73 & -C55 & C51 & -C57 & -C53 & C35 & -C31 & C37 & C33 & -C15 & C11 & -C17 & -C13 \\ C77 & -C75 & C73 & -C71 & -C57 & C55 & -C53 & C51 & C37 & -C35 & C33 & -C31 & -C17 & C15 & -C13 & C11 \end{bmatrix} \quad (9)$$

Each coefficient $C_{uv}$ can be developed with a formula of triangle function expressed by the following formula (10).

$$\cos(u)\cos(v) = \frac{1}{2}(\cos(u+v) + \cos(u-v)) \quad (10)$$

FIGS. 5 to 13 show examples of development of first to ninth tensor product calculating units 10 to 18 described in "Processor Architecture Driven Algorithm Optimization for Fast 2D-DCT," by Ichiro Kuroda, VLSI Signal Processing VIII, p.p. 481–490, 1995. Referring to the drawings, in a branch with indexes r and n, multiplications are preformed with multiplication coefficients expressed by the following formula (11).

$$rn = \frac{1}{8}\cos\left[\frac{n\pi}{16}\right] \quad (11)$$

In FIGS. 5 to 13, calculated results of individual tensor product calculating units are expressed by (ij)'.

The one-dimensional butterfly calculating units 20 and 21 (shown in FIG. 1) perform one-dimensional butterfly calculations of which the added result of first input data and second input data is supplied as first output data and the subtracted result of second input data from first input data is supplied as second output data.

The two-dimensional butterfly calculating units 19 and 22 (see FIG. 1) includes first to fourth one-dimensional butterfly calculating units, which are different from one-dimensional butterfly calculating units 20 or 21, and perform two-dimensional butterfly calculations of which first output data of the first one-dimensional butterfly calculating unit is supplied as first input data of the third one-dimensional butterfly calculating unit, first output data of the second one-dimensional calculating unit is supplied as second input data of the third one-dimensional butterfly calculating unit, second output data of the first one-dimensional butterfly calculating unit is supplied as first input data of the fourth one-dimensional butterfly calculating unit, second output data of the second one-dimensional butterfly calculating unit is supplied as second input data of the fourth one-dimensional butterfly calculating unit, first output data of the third one-dimensional butterfly calculating unit is supplied as first output data of the two-dimensional butterfly calculating units, first output data of the fourth one-dimensional butterfly calculating unit is supplied as second output data of the two-dimensional butterfly calculating units, second output data of the third one-dimensional butterfly calculating circuit is supplied as third output data of the two-dimensional butterfly calculating units, and second output data of fourth one-dimensional butterfly calculating unit is supplied as fourth output data of the two-dimensional butterfly calculating units.

Figure 14:
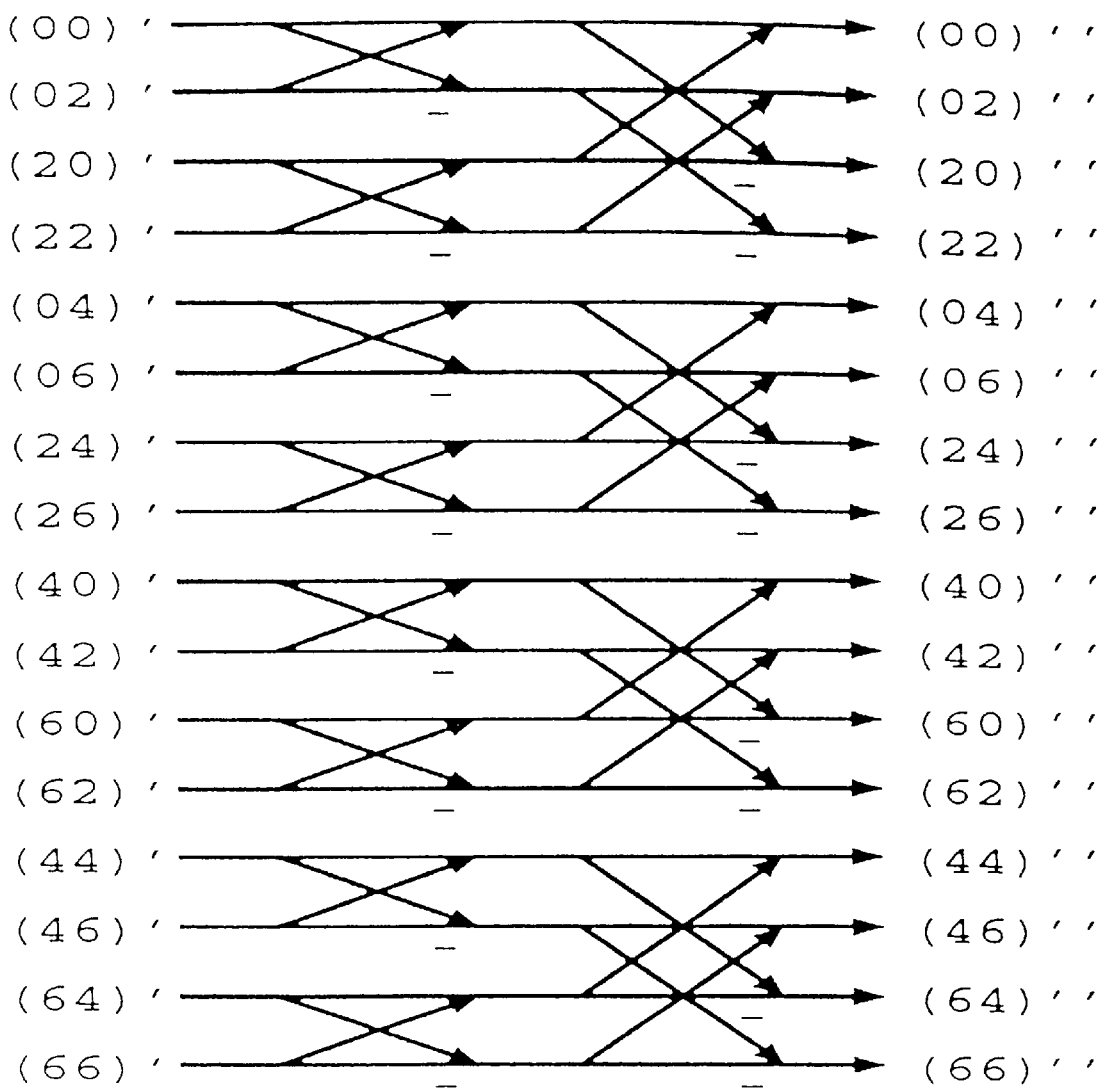
FIG. 14 is a schematic diagram showing signal flow in a two-dimensional butterfly calculating unit 19 according to an embodiment of the present invention.

With reference to FIG. 1, the first two-dimensional butterfly calculating unit 19 receives the calculated results (00)', (02)', (20)', (22)', (04), (06)', (24)', (26)', (40)', (42)', (60)', (62)', (44)', (46)', (64)', and (66)' of the first to fourth tensor product calculating units 10 to 13 (see FIGS. 5 to 8) and perform four-point×four-point two-dimensional butterfly calculations for them as shown in FIG. 14.

With reference to FIG. 1, the first one-dimensional butterfly calculating unit 20 receives the calculated results (01)', (21)', (03)', (23)', (05)', (25)', (07)', (27)', (41)', (61)', (43)', (63)', (45)', (65)', (47)', and (67)' of the fifth and sixth tensor product calculating units 14 and 15 (see FIGS. 9 and 10) and perform 16-point one-dimensional butterfly calculations for them as shown in FIG. 15.

Figure 16:
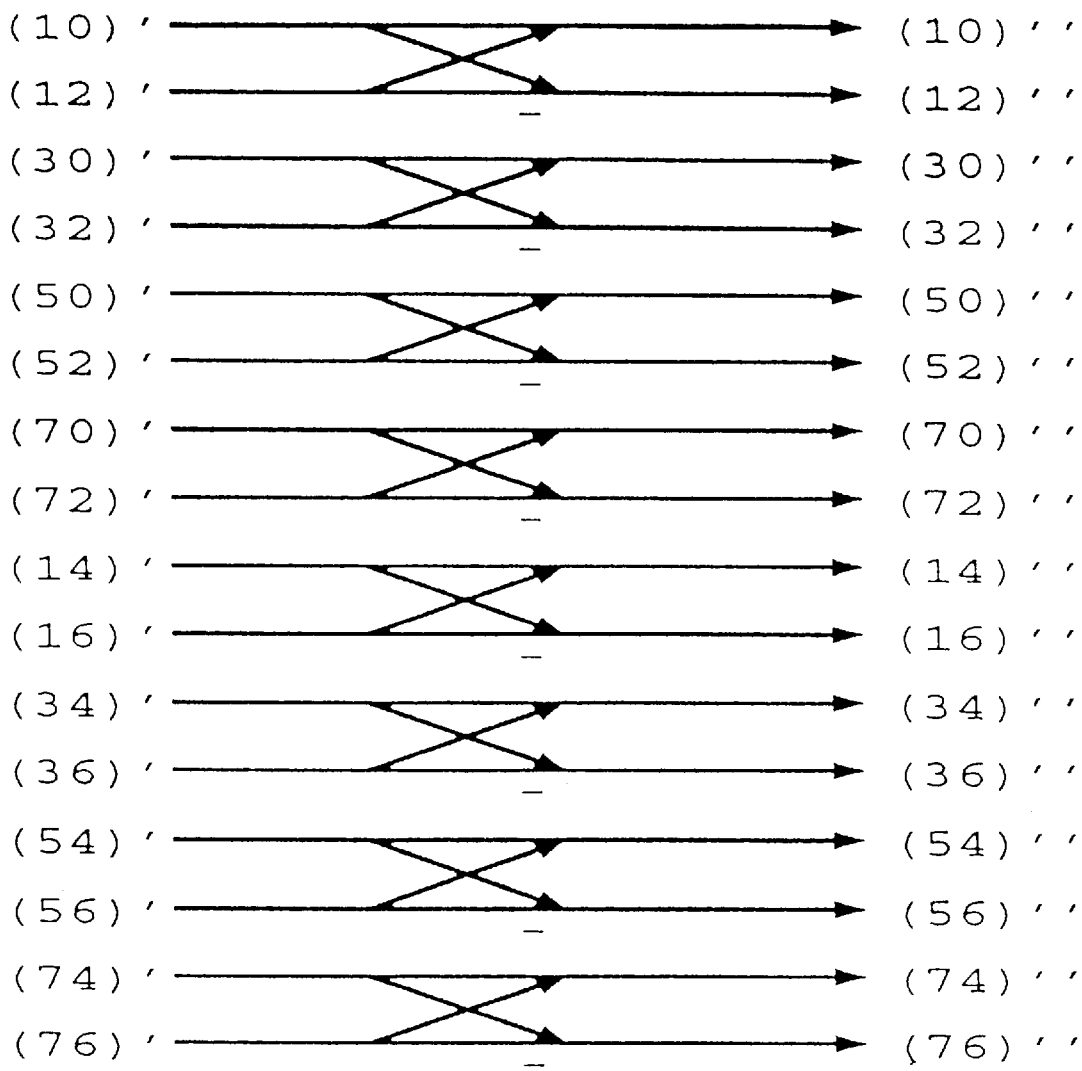
FIG. 16 is a schematic diagram showing signal flow in a one-dimensional butterfly calculating unit 21 according to an embodiment of the present invention.

The second one-dimensional butterfly calculating unit 21 receives the calculated results (10)', (12)', (30)', (32)', (50)', (52)', (70)', (72)', (14)', (16)', (34)', (36)', (54)', (56)', (74)', and (76)' of the seventh and eighth tensor product calculating units 16 and 17 (see FIGS. 11 and 12) and perform 16-point one-dimensional butterfly calculations for them as shown in FIG. 16.

Figure 17:
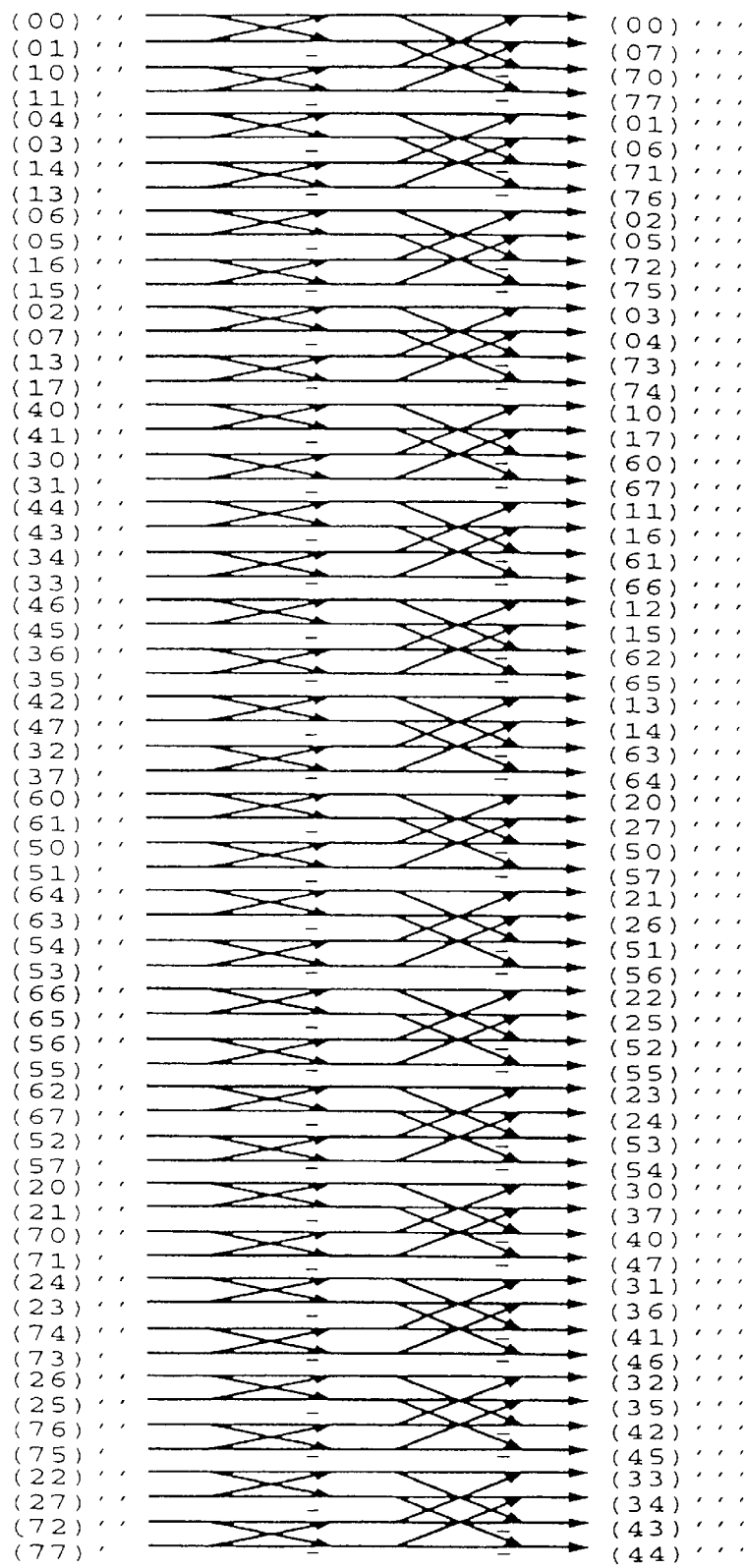
FIG. 17 is a schematic diagram showing signal flow in a two-dimensional butterfly calculating unit 22 according to an embodiment of the present invention.

When the calculated results of the first two-dimensional butterfly calculating unit 19 and the first and second one-dimensional butterfly calculating units 20 and 21 are expressed by (ij)" (see FIGS. 14, 15, and 16), the second two-dimensional butterfly calculating unit 22 receives the calculated results (00)", (01)", (10)", (11)', (04)", (03)", (14)", (13)', (06)", (05)", (16)", (15)', (02)", (07)", (13)", (17)', (40)", (41)", (30)", (31)', (44)", (43)", (34)", (33)', (46)", (45)", (36)", (35)', (42)", (47)", (32)", (37)', (60)", (61)", (50)", (51)', (64)", (63)", (54)", (53)', (66)", (65)", (56)", (55)', (62)", (67)", (52)", (57)', (20)", (21)", (70)", (71)', (24)", (23)", (74)", (73)', (26)", (25)", (76)", (75)', (22)", (27)", (72)", and (77)' of the first two-dimensional butterfly calculating unit 19, the first and second one-dimensional butterfly calculating units 20 and 21, and the ninth tensor product calculating unit 18 and performs eight-point×eight-point two-dimensional butterfly calculations for them as shown in FIG. 17. The calculated results expressed by (ij)'" shown in FIG. 17 are supplied as output data of the eight-point×eight-point two-dimensional IDCT circuit.

When the first to ninth determining units 1 to 9 have not determined the necessity of the tensor product calculations respectively, the calculated results of the corresponding first to ninth tensor product calculating units 10 to 18 are set to zero data.

(Second Embodiment)

Figure 2:
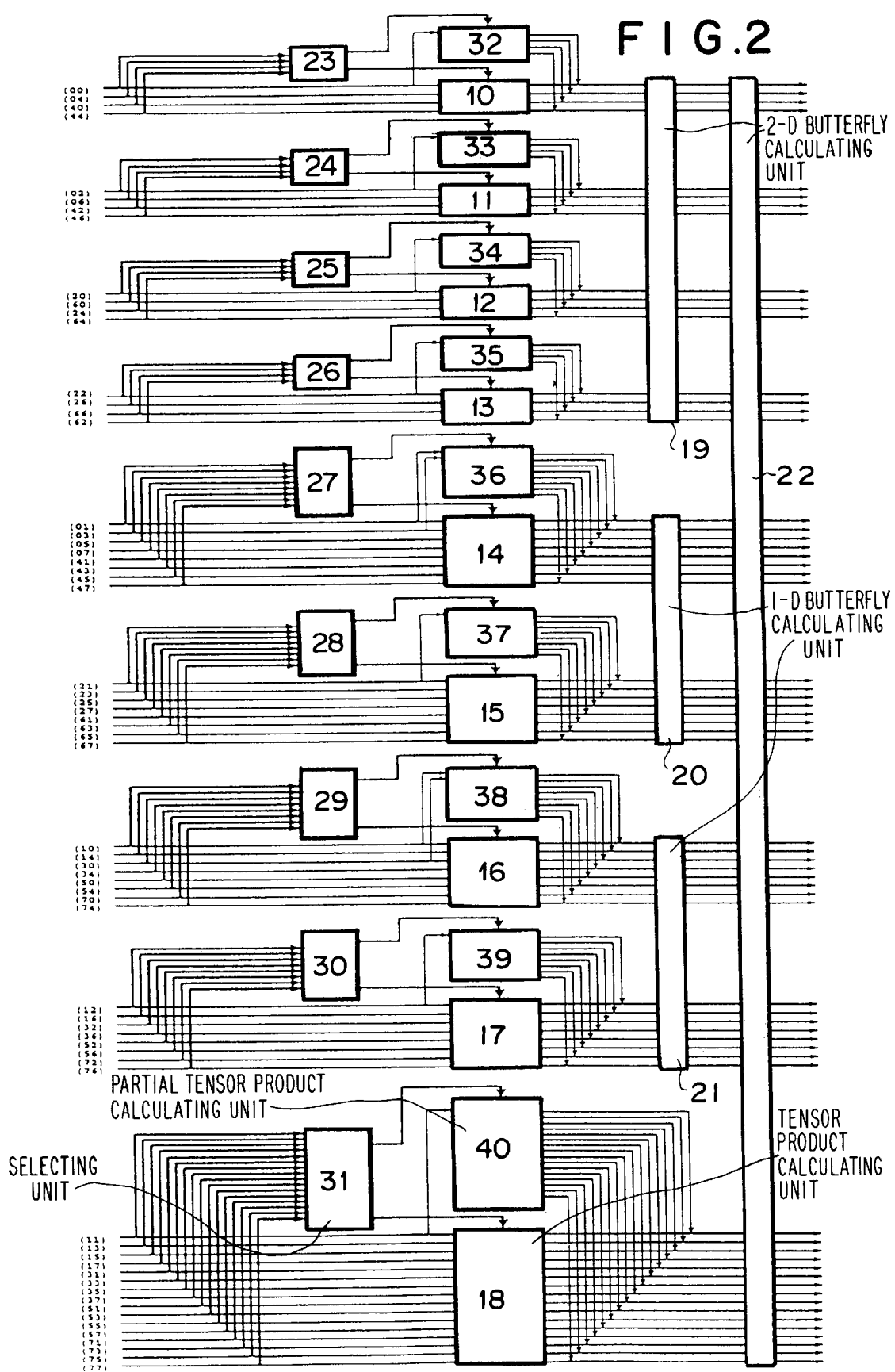
FIG. 2 is a block diagram showing the structure of a second embodiment of the present invention.

FIG. 2 is a schematic diagram showing the structure of a two-dimensional IDCT circuit according to a second embodiment of the present invention. With reference to FIG. 2, partial tensor product calculating units 32 to 40 are disposed corresponding to tensor product calculating units 10 to 18, respectively. First to ninth selecting units 23 to 31 are disposed on the input side of the tensor product calculating units 10 to 18 and the partial tensor product calculating units 32 to 40.

With reference to FIG. 2, the first selecting unit 23 determines whether or not the received data (DCT coefficients) (00), (04), (40), and (44) are zero data. When at least one of the received data other than predetermined data is non-zero data, the first selecting unit 23 selects the first tensor product calculating unit 10. When all of the received data other than the predetermined data are zero data, the first selecting unit 23 selects the first partial tensor product calculating unit 32.

The second selecting unit 24 determines whether or not the received data (DCT coefficients) (02), (06), (42), and (46) are zero data. When at least one of the received data other than predetermined data is non-zero data, the second selecting unit 24 selects the second tensor product calculating unit 11. When all of the received data other than the predetermined data are zero data, the second selecting unit 24 selects the second partial tensor product calculating unit 33.

The third selecting unit 25 determines whether or not the received data (DCT coefficients) (20), (24), (60), and (64) are zero data. When at least one of the received data other than predetermined data is non-zero data, the third selecting unit 25 selects the third tensor product calculating unit 12. When all of the received data other than the predetermined data are zero data, the third selecting unit 25 selects the third partial tensor product calculating unit 34.

The fourth selecting unit 26 determines whether or not the received data (DCT coefficients) (22), (26), (62), and (66) are zero data. When at least one of the received data other than predetermined data is non-zero data, the fourth selecting unit 26 selects the fourth tensor product calculating unit 13. When all of the received data other than the predetermined data are zero data, the fourth selecting unit 26 selects the fourth partial tensor product calculating unit 35.

The fifth selecting unit 27 determines whether or not the received data (DCT coefficients) (01), (03), (05), (07), (41), (43), (45), and (47) are zero data. When at least one of the received data other than predetermined data is non-zero data, the fifth selecting unit 27 selects the fifth tensor product calculating unit 14. When all of the received data other than the predetermined data are zero data, the fifth selecting unit 27 selects the fifth partial tensor product calculating unit 36.

The sixth selecting unit 28 determines whether or not the received data (DCT coefficients) (21), (23), (25), (27), (61), (63), (65), and (67) are zero data. When at least one of the received data other than predetermined data is non-zero data, the sixth selecting unit 28 selects the sixth tensor product calculating unit 15. When all of the received data other than the predetermined data are zero data, the sixth selecting unit 28 selects the sixth partial tensor product calculating unit 37.

The seventh selecting unit 29 determines whether or not the received data (DCT coefficients) (10), (14), (30), (34), (50), (54), (70), and (74) are zero data. When at least one of the received data other than predetermined data is non-zero data, the seventh selecting unit 29 selects the seventh tensor product calculating unit 16. When all of the received data other than the predetermined data are zero data, the seventh selecting unit 29 selects the seventh partial tensor product calculating unit 38.

The eighth selecting unit 30 determines whether or not the received data (DCT coefficients) (12), (16), (32), (36), (52), (56), (72), and (76) are zero data. When at least one of the received data other than predetermined data is non-zero data, the eighth selecting unit 30 selects the eighth tensor product calculating unit 17. When all of the received data other than the predetermined data are zero data, the eighth selecting unit 30 selects the eighth partial tensor product calculating unit 39.

The ninth selecting unit 31 determines whether or not the received data (DCT coefficients) (11), (13), (15), (17), (31), (33), (35), (37), (51), (53), (55), (57), (71), (73), (75), and (77) are zero data. When at least one of the received data other than predetermined data is non-zero data, the ninth selecting unit 31 selects the ninth tensor product calculating unit 18. When all of the received data other than the predetermined data are zero data, the ninth selecting unit 31 selects the ninth partial tensor product calculating unit 40.

The partial tensor product calculation is a tensor product calculation of which part of received data are treated as valid received data. For example, only coefficients (00), (02), (20), (22), (01), (03), (21), (10), (30), (12), and (11) are treated as valid input data.

Figure 18:
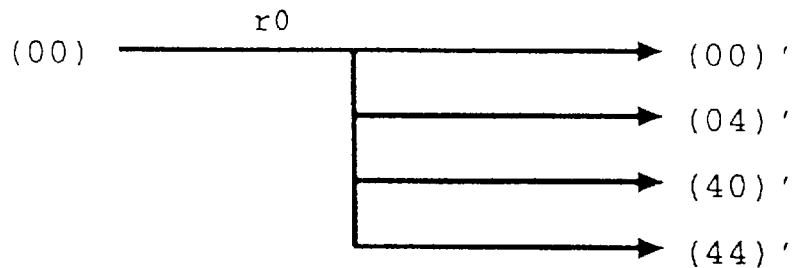
FIG. 18 is a schematic diagram showing signal flow in a partial tensor product calculating unit 23 according to an embodiment of the present invention.

In this case, the first partial tensor product calculating unit 32 receives a DCT coefficient (00), performs calculations as shown in FIG. 18, and supplies calculated results (00)', (04)', (40)', and (44)' as tensor production calculated results. In this case, the following relation is satisfied.

$$(00)'=(04)'=(40)'=(44)'=r0\times(00) =(\tfrac{1}{8})\times(00)$$

Figure 19:
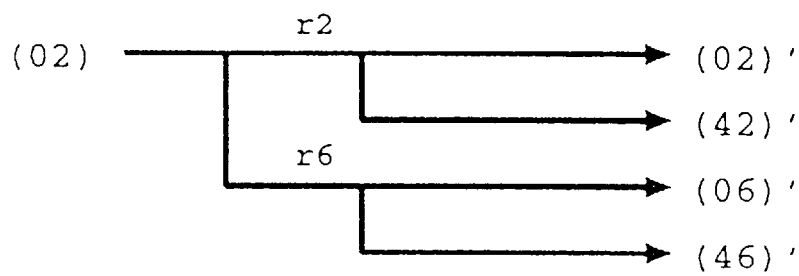
FIG. 19 is a schematic diagram showing signal flow in a partial tensor product calculating unit 24 according to an embodiment of the present invention.

The second partial tensor product calculating unit 33 receives a DCT coefficient (02), performs calculations as shown in FIG. 19, and supplies calculated results (02)'= (42)'=r2×(02) and (06)'=(46)'=r6×(02).

Figure 20:
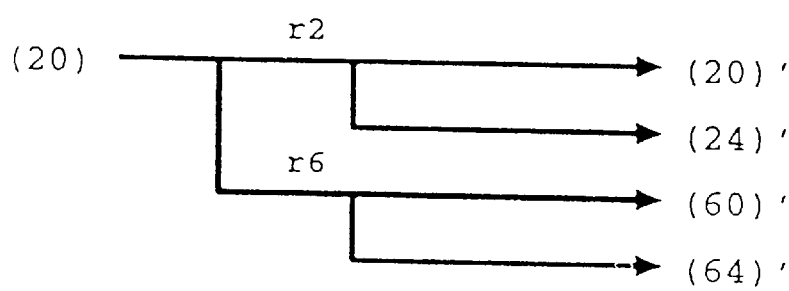
FIG. 20 is a schematic diagram showing signal flow in a partial tensor product calculating unit 25 according to an embodiment of the present invention.

The third partial tensor product calculating unit 34 receives a DCT coefficient (20), performs calculations as shown in FIG. 20, and supplies calculated results (20)'= (24)'=r2×(20) and (60)'=(64)'=r6×(20).

Figure 21:
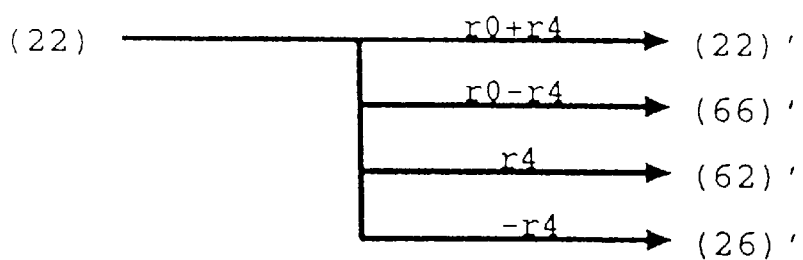
FIG. 21 is a schematic diagram showing signal flow in a partial tensor product calculating unit 26 according to an embodiment of the present invention.

The fourth partial tensor product calculating unit 35 receives a DCT coefficient (22), performs calculations as shown in FIG. 21, and supplies calculated results (22)'=(r0+ r4)×(22), (66)'=(r0−r4)×(22), (62)'=r4×(22) and (26)'=(-r4)× (22).

Figure 22:
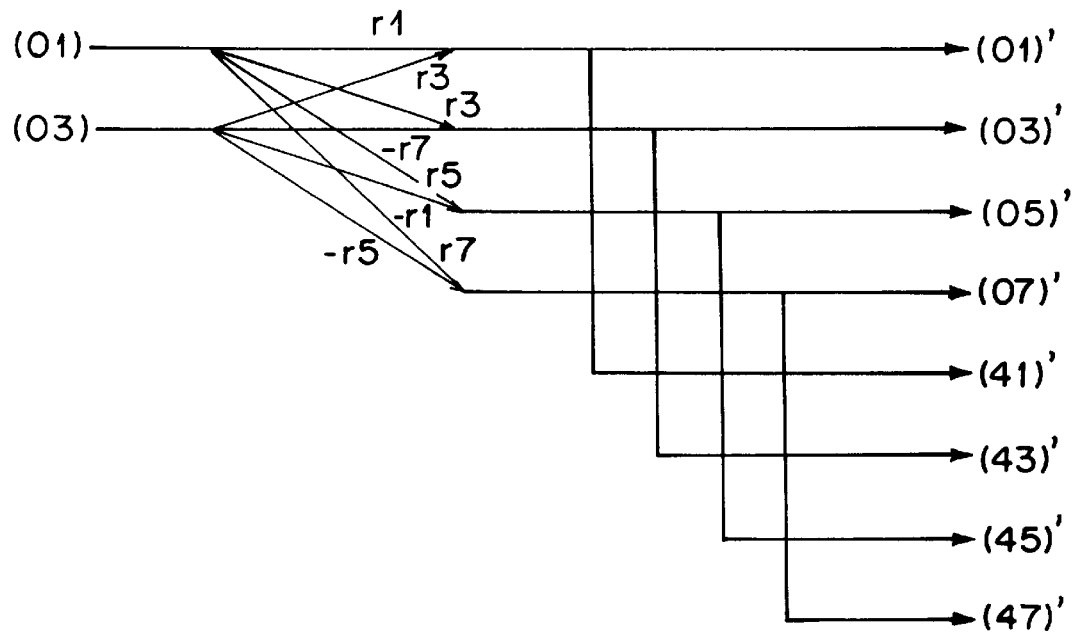
FIG. 22 is a schematic diagram showing signal flow in a partial tensor product calculating unit 27 according to an embodiment of the present invention.

The fifth partial tensor product calculating unit 36 receives coefficients (01) and (03) and performs calculations as shown in FIG. 22. Calculations expressed by rn for each branch are performed in a similar way as shown in FIGS. 18 to 21.

Figure 23:
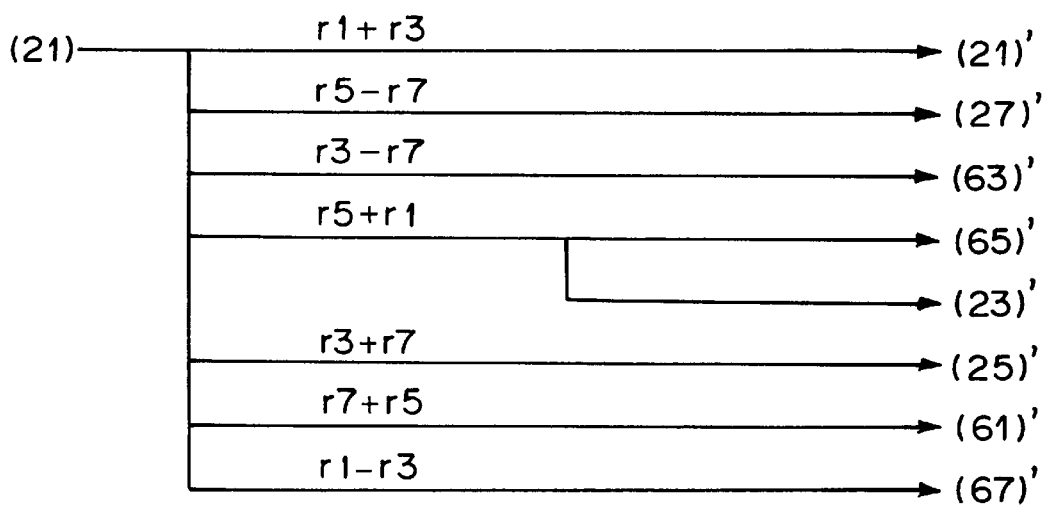
FIG. 23 is a schematic diagram showing signal flow in a partial tensor product calculating unit 28 according to an embodiment of the present invention.

The sixth partial tensor product calculating unit 37 receives a coefficient (21) and performs calculations as shown in FIG. 23.

Figure 24:
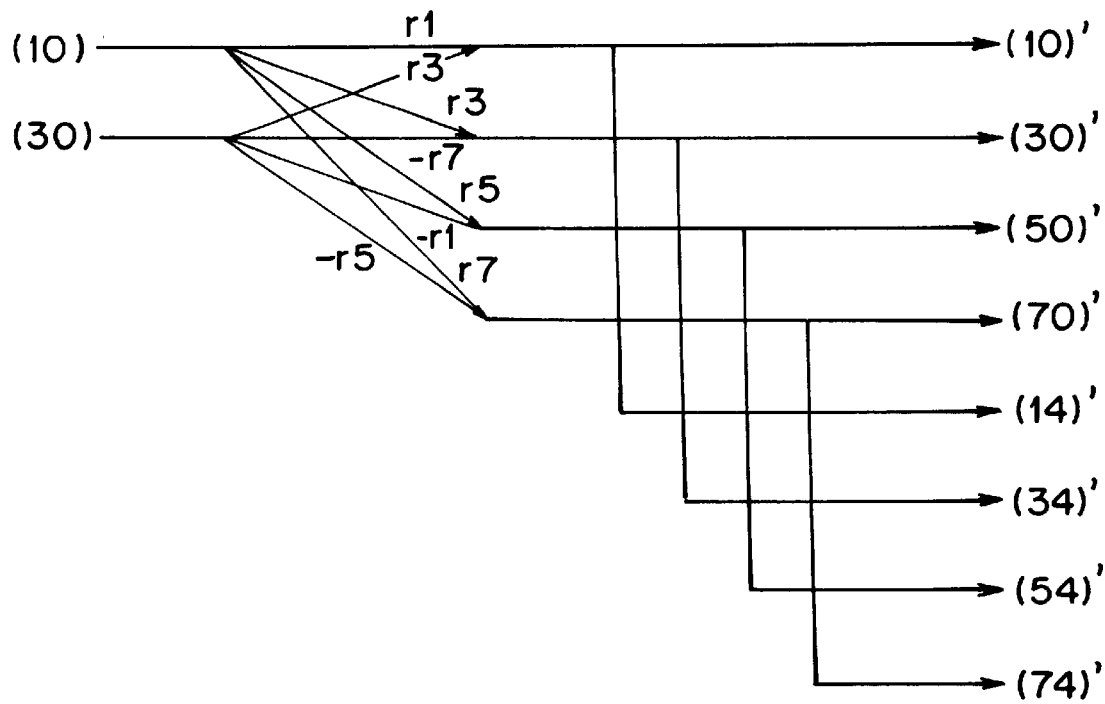
FIG. 24 is a schematic diagram showing signal flow in a partial tensor product calculating unit 29 according to an embodiment of the present invention.

The seventh partial tensor product calculating unit 38 receives coefficients (10) and (30) and performs calculations as shown in FIG. 24.

Figure 25:
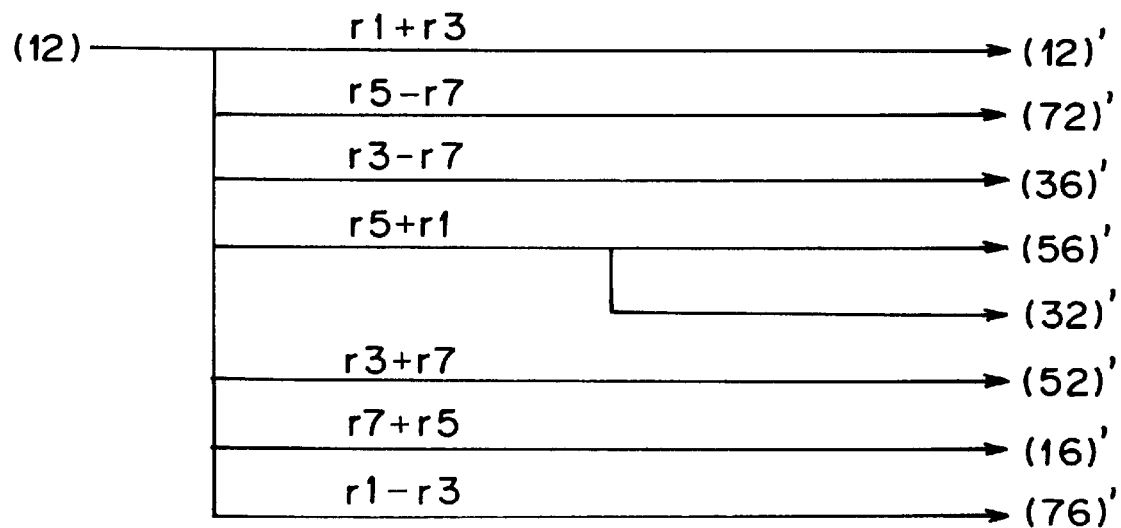
FIG. 25 is a schematic diagram showing signal flow in a partial tensor product calculating unit 30 according to an embodiment of the present invention.

The eighth partial tensor product calculating unit 39 receives a coefficients (12) and performs calculations as shown in FIG. 25.

Figure 26:
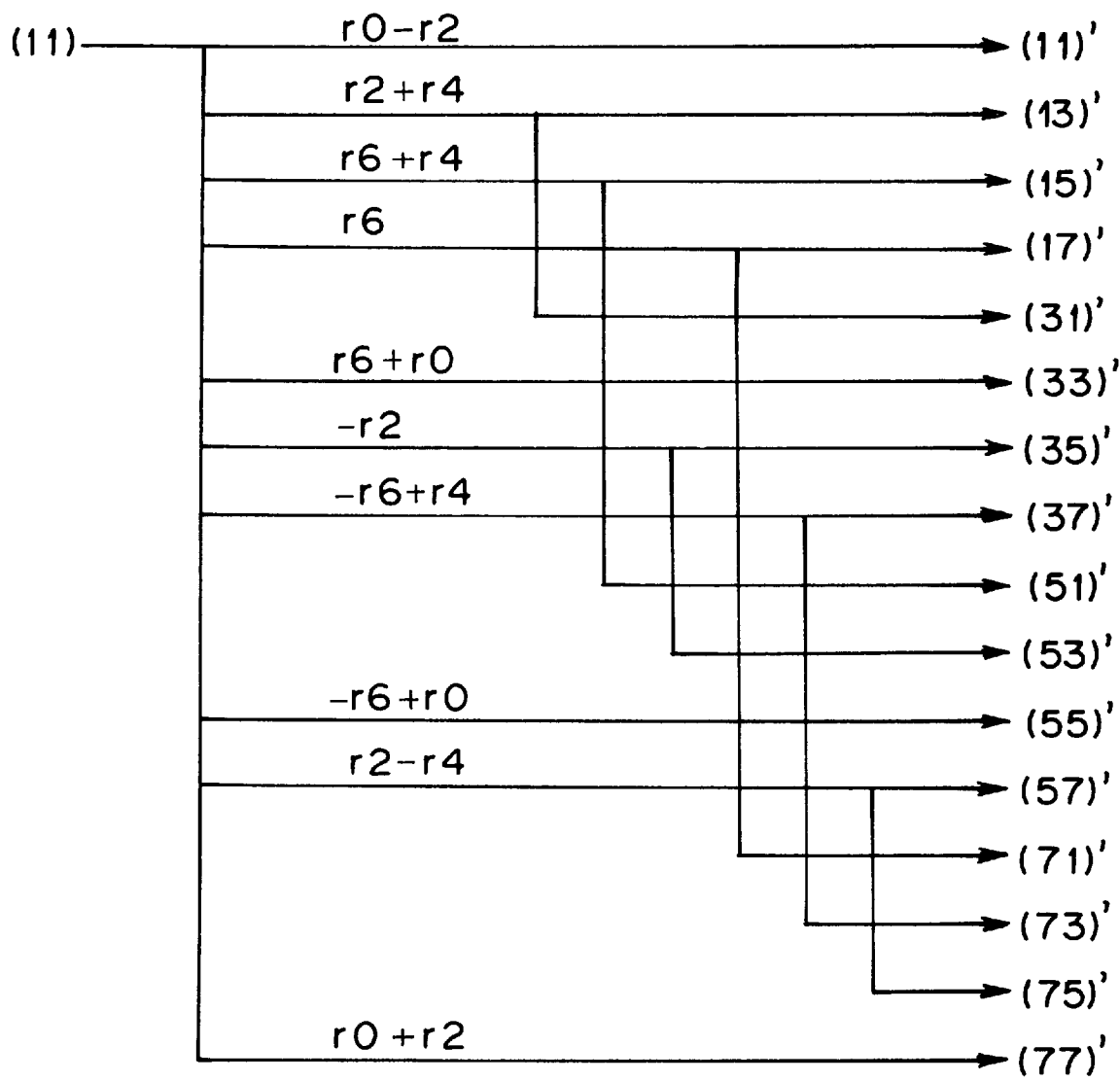
FIG. 26 is a schematic diagram showing signal flow in a partial tensor product calculating unit 31 according to an embodiment of the present invention.
Figure 30:
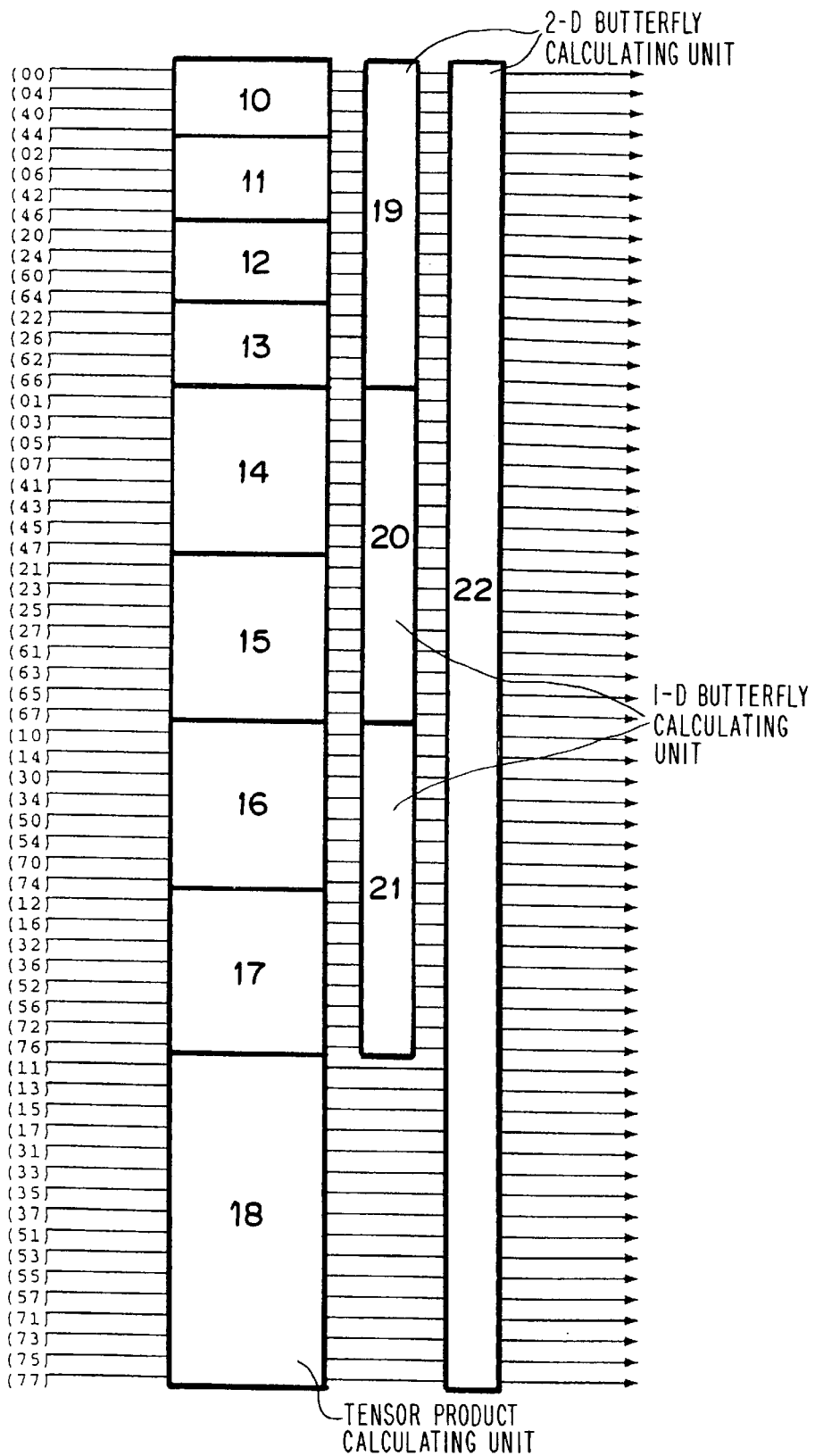
FIG. 30 is a block diagram showing a conventional two-dimensional inverse discrete cosine transform circuit.

The ninth partial tensor product calculating unit 40 receives a coefficients (11) and performs calculations as shown in FIG. 26.

In this embodiment, a set of coefficients other than the above may be used as valid input data of the first to ninth partial tensor product calculating units 32 to 40. However, if valid data of the first to ninth partial tensor product calculating units 32 to 40 are increased, although the probability of selecting partial tensor product calculations increases, the amount of reduction in the number of calculations obtained by selecting partial tensor product calculation instead of tensor product calculation decreases.

The first two-dimensional butterfly calculating unit 19 receives one of calculated results of the first tensor product calculating unit 10 and the first partial tensor product calculating unit 32, one of the second tensor product calculating unit 11 and the second partial tensor product calculating unit 33, one of the third tensor product calculating unit 12 and the third partial tensor product calculating unit 34, and one of the fourth tensor product calculating unit 13 and the fourth partial tensor product calculating unit 35, and performs four-point×four-point two-dimensional butterfly calculations for them as shown in FIG. 14.

The first one-dimensional butterfly calculating unit 20 receives calculated results of one of the fifth tensor product calculating unit 14 and the fifth partial tensor product calculating unit 36, and one of the sixth tensor product calculating unit 15 and the sixth partial tensor product calculating unit 37, and performs 16-point one-dimensional butterfly calculations for them as shown in FIG. 15.

The second one-dimensional butterfly calculating unit 21 receives calculated results of one of the seventh tensor product calculating unit 16 and the seventh partial tensor product calculating unit 38, and one of the eighth tensor product calculating unit 17 and the eighth partial tensor product calculating unit 38 m and performs 16-point one-dimensional butterfly calculations for them as shown in FIG. 16.

The second two-dimensional butterfly calculating unit 22 receives calculated results of the first two-dimensional butterfly calculating unit 19, the first and second one-dimensional butterfly calculating units 20 and 21, one of the ninth tensor product calculating units 18 and the ninth partial tensor product calculating unit 40, and performs eight-point×eight-point two-dimensional butterfly calculations as shown in FIG. 17.

(Third Embodiment)

Next, a two-dimensional (IDCT circuit) according to a third embodiment of the present invention will be described.

Input DCT coefficients are assigned to addresses as shown in FIG. 27. In H. 261, which is a picture encoding system for moving picture communication, MPEG(Moving Picture coding Experts Group), which is a moving picture encoding system, JPEG (Joint Photographic coding Experts Group), which is a still picture encoding system, and so forth, DCT coefficients are encoded in the order as shown in FIG. 27 and EOB code is added at the end of a significant DCT coefficient code. DCT coefficients after the EOB code are not encoded.

In DCT coefficients shown in FIG. 27, information that represents the position of EOB code is referred to as EOB address. Indexes i and j of input coefficients and the first to ninth tensor product calculating units 10 to 18 have the relation as shown in FIG. 28. Thus, address of input coefficients and the first to ninth tensor product calculating units 10 to 18 have the relation as shown in FIG. 29.

In the two-dimensional IDCT circuit according to each of the first and second embodiments, the values of all of the DCT coefficients are examined to determine whether tensor product calculating units should execute tensor product calculation. However, assuming that data ranging from address 0 to address EOB are treated as non-zero data, none of DCT coefficients has to be examined by the determining units or the selecting units.

Figure 3:
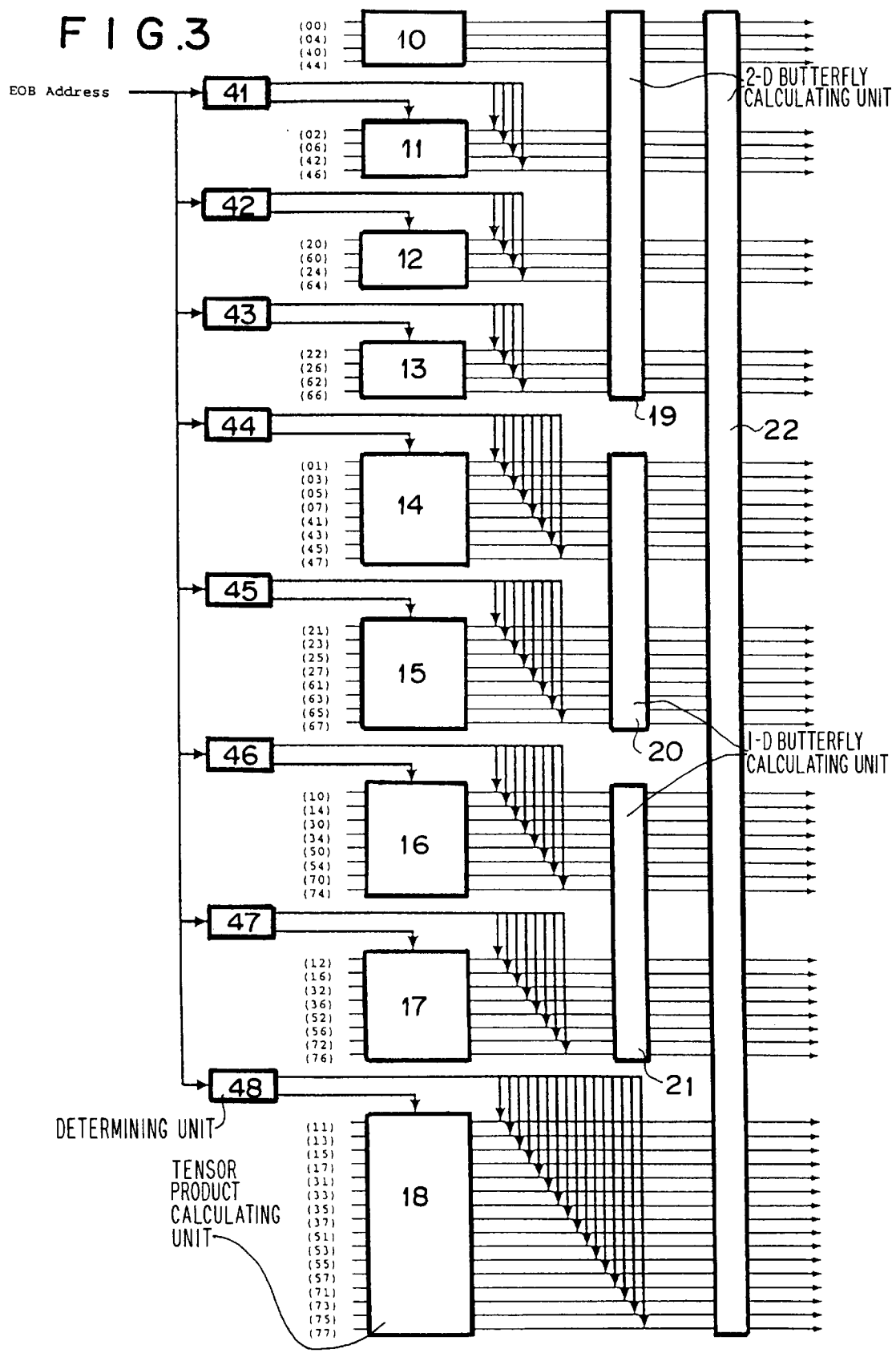
FIG. 3 is a block diagram showing the structure of a third embodiment of the present invention.

FIG. 3 shows the structure of a two-dimensional IDCT circuit according to the third embodiment. Referring to FIG. 3, a first tensor product calculating unit 10 always performs tensor product calculations.

A first determining unit 41 determines whether or not the EOB address is "5" or more. When the EOB address is "5" or more, a second tensor product calculating unit 11 performs tensor product calculations. When the EOB address is less than "5," the second tension product calculating unit 11 does not perform tensor product calculations.

A second determining unit 42 determines whether or not the EOB address is "3" or more. When the EOB address is "3" or more, a third tensor product calculating unit 12 performs tensor product calculations. When the EOB address is less than "3," the third tension product calculating unit 12 does not perform tensor product calculations.

A third determining unit 43 determines whether or not the EOB address is "12" or more. When the EOB address is "12" or more, a fourth tensor product calculating unit 13 performs tensor product calculations. When the EOB address is less than "12," the fourth tension product calculating unit 13 does not perform tensor product calculations.

A fourth determining unit 44 determines whether or not the EOB address is "1" or more. When the EOB address is "1" or more, a fifth tensor product calculating unit 14 performs tensor product calculations. When the EOB address is less than "1," the fifth tension product calculating unit 14 does not perform tensor product calculations.

A fifth determining unit 45 determines whether or not the EOB address is "8" or more. When the EOB address is "8" or more, a sixth tensor product calculating unit 15 performs tensor product calculations. When the EOB address is less than "8," the sixth tension product calculating unit 15 does not perform tensor product calculations.

A sixth determining unit 46 determines whether or not the EOB address is "2" or more. When the EOB address is "2" or more, a seventh tensor product calculating unit 16 performs tensor product calculations. When the EOB address is less than "2," the seventh tension product calculating unit 16 does not perform tensor product calculations.

A seventh determining unit 47 determines whether or not the EOB address is "7" or more. When the EOB address is "7" or more, an eighth tensor product calculating unit 17 performs tensor product calculations. When the EOB address is less than "17," the eighth tensor product calculating unit 17 does not perform tensor product calculations.

An eighth determining unit 48 determines whether or not the EOB address is "4" or more. When the EOB address is "4" or more, a ninth tensor product calculating unit 18 performs tensor product calculations. When the EOB address is less than "4," the ninth tensor product calculating unit 18 does not perform tensor product calculations.

To summarize, only when the first to eighth determining units 41 to 48 have determined the necessity of tensor product calculations by the corresponding tensor product calculators respectively, the corresponding one among second to ninth tensor product calculating units 11 to 18 performs tensor product calculation.

The first to ninth tensor product calculating units 10 to 18, the first and second two-dimensional butterfly calculating units 19 and 22, and the first and second one-dimensional butterfly calculating units 20 and 21 in the two-dimensional IDCT circuit according to the third embodiment are the same as those according to the first embodiment. Thus, their description is omitted.

(Fourth Embodiment)

Figure 4:
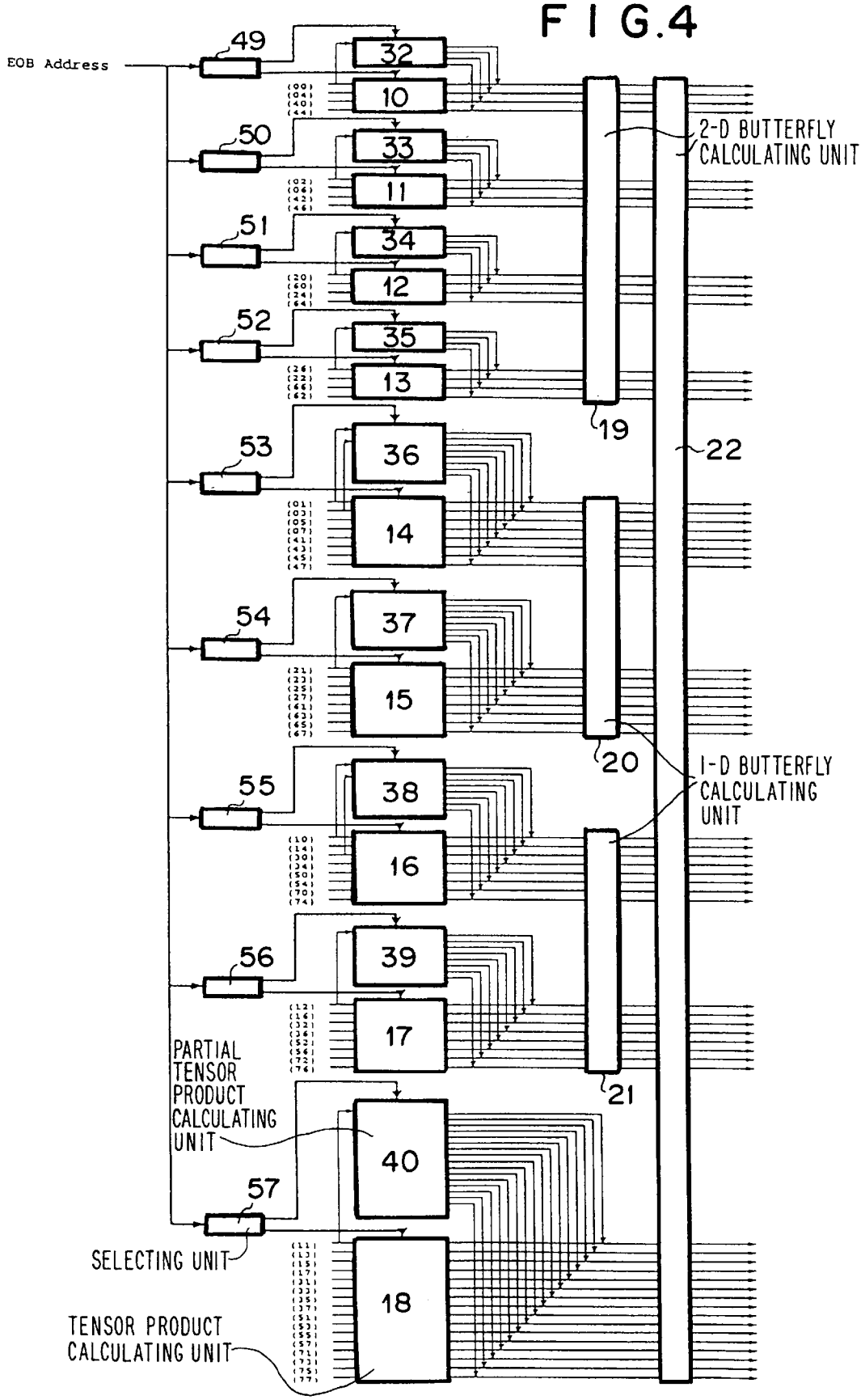
FIG. 4 is a block diagram showing the structure of a fourth embodiment of the present invention.
Figure 5:
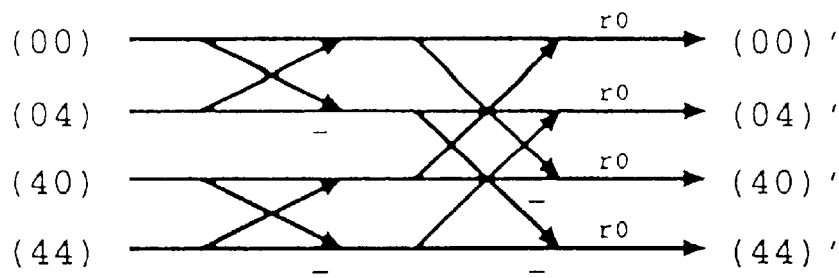
FIG. 5 is a schematic diagram showing signal flow in a tensor product calculating unit 10 according to an embodiment of the present invention.
Figure 6:
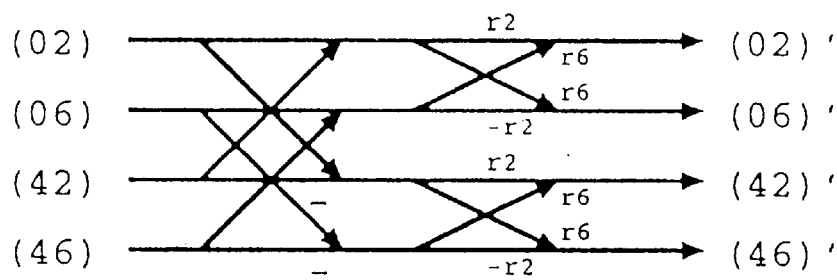
FIG. 6 is a schematic diagram showing signal flow in a tensor product calculating unit 11 according to an embodiment of the present invention.
Figure 7:
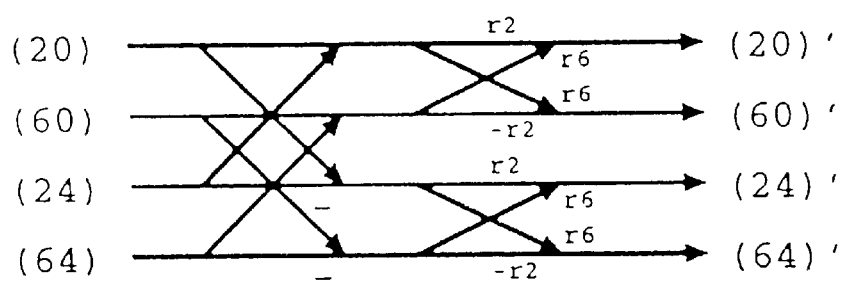
FIG. 7 is a schematic diagram showing calculations performed by a tensor product calculating unit 12 according to an embodiment of the present invention.
Figure 8:
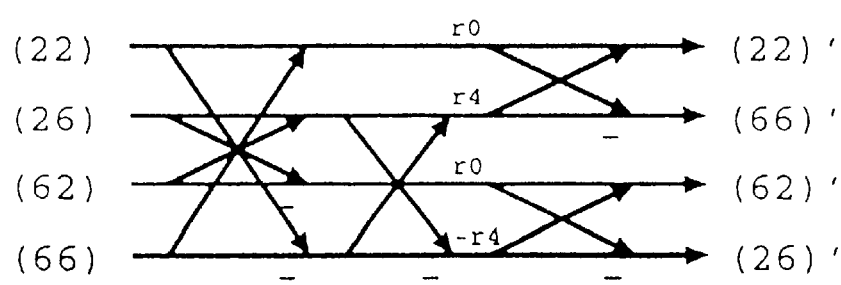
FIG. 8 is a schematic diagram showing signal flow in a tensor product calculating unit 13 according to an embodiment of the present invention.
Figure 9:
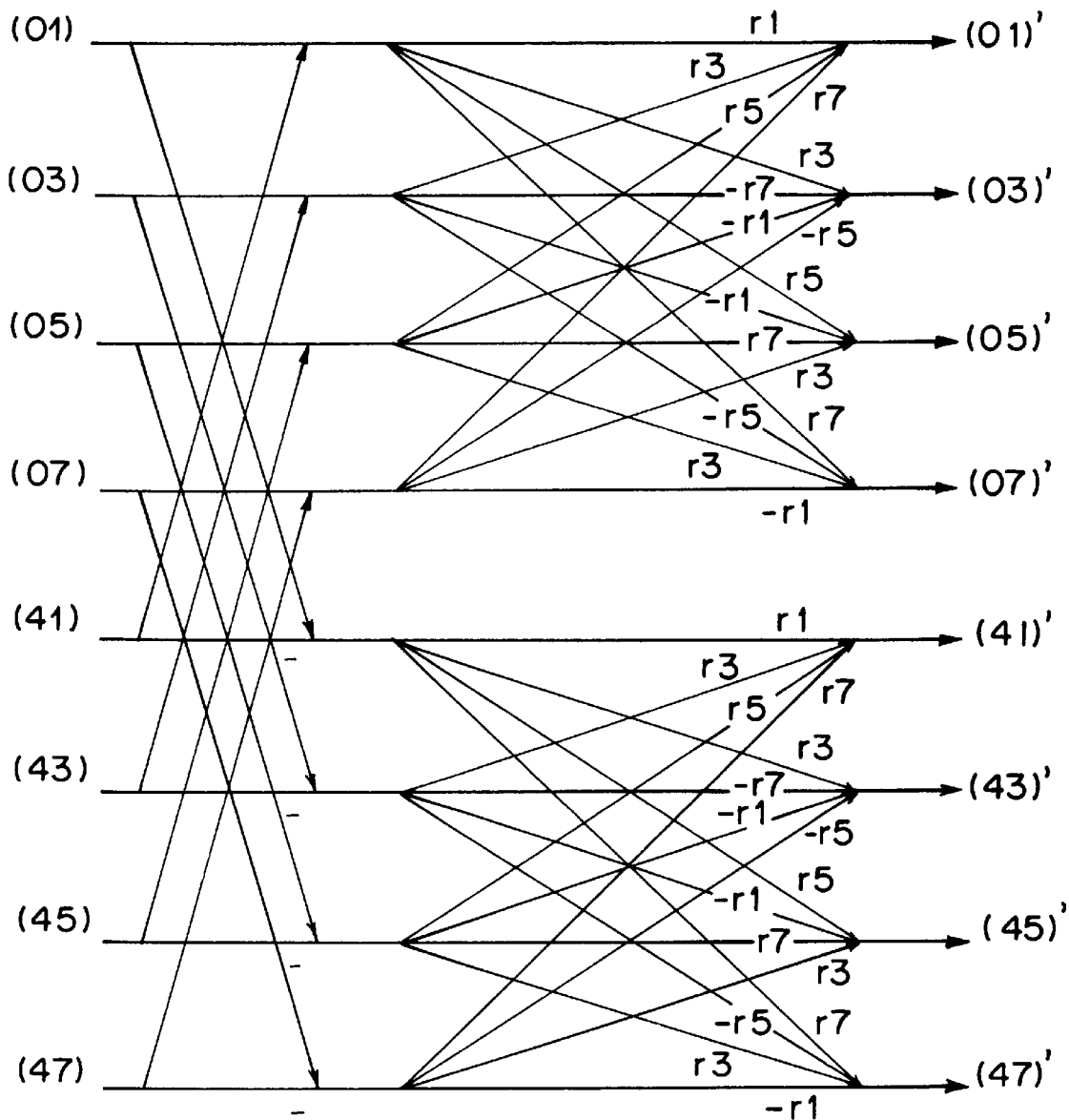
FIG. 9 is a schematic diagram showing signal flow in a tensor product calculating unit 14 according to an embodiment of the present invention.
Figure 11:
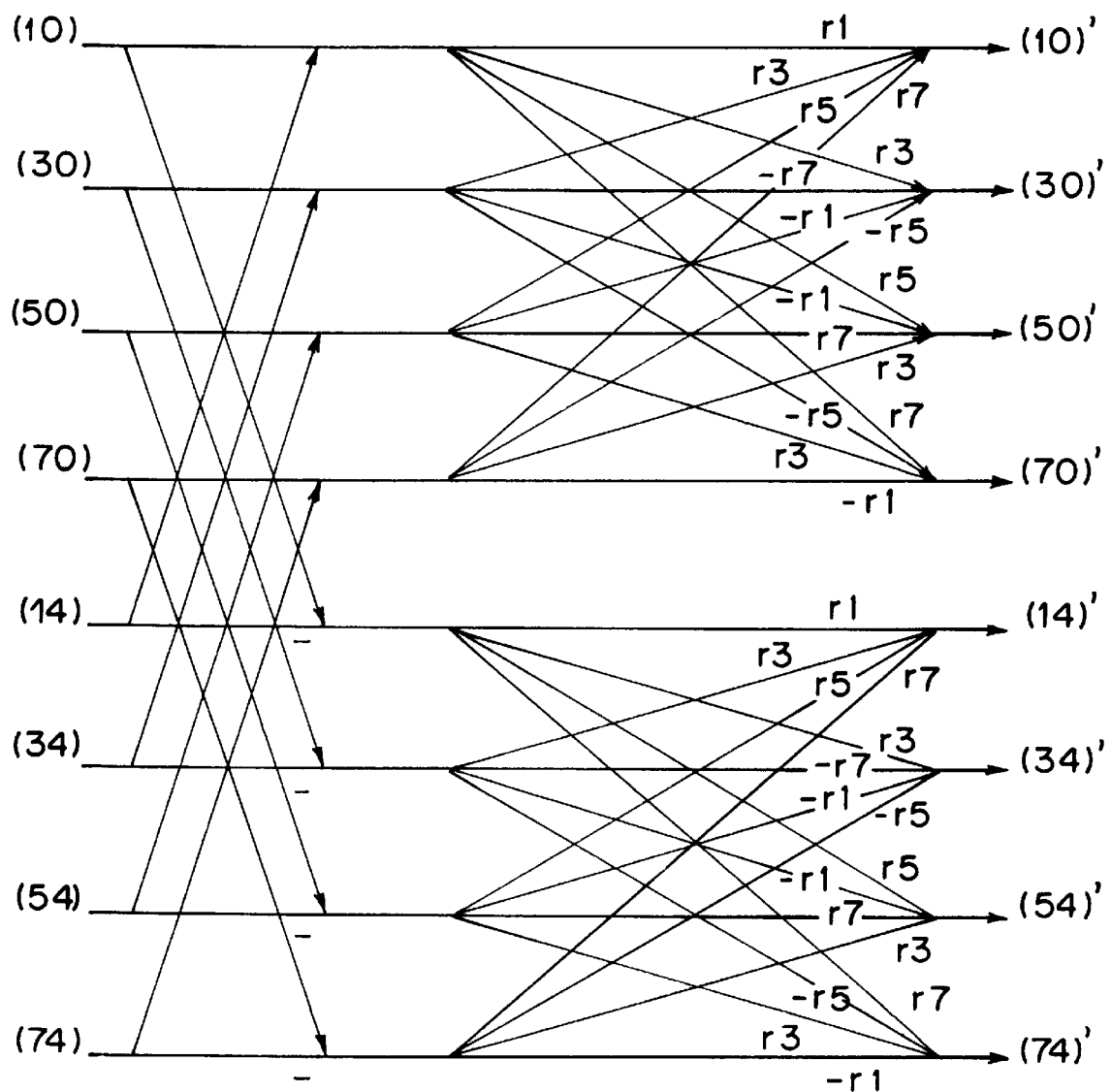
FIG. 11 is a schematic diagram showing signal flow in a tensor product calculating unit 16 according to an embodiment of the present invention.

Next, a fourth embodiment of the present invention will be described. FIG. 4 is a schematic diagram showing the structure of a two-dimensional IDCT circuit according to the fourth embodiment of the present invention.

Referring to FIG. 4, according to the fourth embodiment, first to ninth partial tensor product calculating units 32 to 40 are disposed corresponding to first to ninth tensor product calculating units 10 to 18, respectively. First to ninth selecting units 49 to 57 are disposed corresponding to the first to ninth tensor product calculating units 32 to 40, respectively. The first to ninth selecting units 49 to 57 receive EOB addresses.

Since EOB address that is supplied to the first to ninth selecting units 57 is the same as described in the third embodiment, their description is omitted.

The minimum address of received DCT coefficients of the first to ninth tensor product calculating units 10 to 18 other than of valid received DCT coefficients of the first to ninth partial tensor product calculating units 32 to 40 are defined as first to ninth threshold values, respectively. When EOB address is equal to or larger than the relevant threshold value, each selecting unit selects the relevant tensor product calculating unit instead of the relevant partial tensor product calculating unit. When EOB address is less than the relevant threshold value, each selecting unit selects the relevant partial tensor product calculating unit instead of the relevant tensor product calculating unit.

When EOB address is equal to or larger than the first threshold value, the first selecting unit 49 selects the first tensor product calculating unit 10. When EOB address is less than the first threshold value, the first selecting unit 49 selects the first partial tensor product calculating unit 32.

When EOB address is equal to or larger than the second threshold value, the second selecting unit 50 selects the second tensor product calculating unit 11. When EOB address is less than the second threshold value, the second selecting unit 50 selects the second partial tensor product calculating unit 33.

When EOB address is equal to or larger than the third threshold value, the third selecting unit 51 selects the third tensor product calculating unit 12. When EOB address is less than the third threshold value, the third selecting unit 51 selects the third partial tensor product calculating unit 34.

When EOB address is equal to or larger than the fourth threshold value, the fourth selecting unit 52 selects the fourth tensor product calculating unit 13. When EOB address is less than the fourth threshold value, the fourth selecting unit 52 selects the fourth partial tensor product calculating unit 35.

When EOB address is equal to or larger than the fifth threshold value, the fifth selecting unit 53 selects the fifth tensor product calculating unit 14. When EOB address is less than the fifth threshold value, the fifth selecting unit 53 selects the fifth partial tensor product calculating unit 36.

When EOB address is equal to or larger than the sixth threshold value, the sixth selecting unit 54 selects the sixth tensor product calculating unit 15. When EOB address is less than the sixth threshold value, the sixth selecting unit 54 selects the sixth partial tensor product calculating unit 37.

When EOB address is equal to or larger than the seventh threshold value, the seventh selecting unit 55 selects the seventh tensor product calculating unit 16. When EOB address is less than the seventh threshold value, the seventh selecting unit 55 selects the seventh partial tensor product calculating unit 38.

When EOB address is equal to or larger than the eighth threshold value, the eighth selecting unit 56 selects the eighth tensor product calculating unit 17. When EOB address is less than the eighth threshold value, the eighth selecting unit 56 selects the eighth partial tensor product calculating unit 39.

When EOB address is equal to or larger than the ninth threshold value, the ninth selecting unit 57 selects the ninth tensor product calculating unit 18. When EOB address is less than the ninth threshold value, the ninth selecting unit 57 selects the ninth partial tensor product calculating unit 40.

Only when the first to ninth selecting units 49 to 57 select the first to ninth tensor product calculating units 10 to 18, the first to ninth tensor product calculating units 10 to 18 perform tensor product calculations, respectively.

Only when the first to ninth selecting units 49 to 57 select the first to ninth partial tensor product calculating units 32 to 40, the first to ninth partial tensor product calculating units 32 to 40 perform partial tensor product calculations, respectively.

When DCT coefficients denoted by addresses 0, 5, 3, 12, 1, 6, 8, 2, 9, 7, and 4 shown in FIG. 29 are valid received data of the first to ninth partial tensor product calculating units 32 to 40, the first to ninth threshold values are 10, 23, 21, 37, 15, 17, 16, 18 and 11, respectively.

The first to ninth tensor product calculating units 10 to 18, the partial tensor product calculating units 32 to 40, the first and second two-dimensional butterfly calculating units 19 and 22, and the first and second one-dimensional butterfly calculating units 20 and 21 in the two-dimensional IDCT circuit according to the fourth embodiment are the same as those in the second embodiment.

Next, the operation and effect of each of the above-described embodiments will be described.

According to the above described embodiments, when all of the received DCT coefficients of each tensor calculation are zero data, the tensor product calculations are not performed. Thus, the number of tensor product calculations can be reduced.

When tensor product calculations developed to calculations as shown in FIGS. 5 to 13 are executed by a processor that executes an addition/subtraction, a multiplication, and a sum-of-product calculation in a single instruction, the first to third tensor product calculations require 16 instructions each, the fourth tensor product calculations require 18 instructions, the fifth and seventh tensor product calculations require 48 instructions each, the sixth and eighth tensor product calculations require 56 instructions each, and the ninth tensor product calculation requires 108 instructions.

According to the first embodiment, when all of the received DCT coefficients of each tensor product calculation are zero data, a tensor product calculation thereof is not performed. Thus, the number of instructions of inverse-descrete cosine transformation can be reduced by the sum of numbers of instructions omitted. However, since the number of calculations of the detecting units that determine the necessity of the tensor product calculations increases, the number of calculations that is reduced is given by (the number of calculations for tensor product calculations that are omitted)—(the number of calculations required by the determining units).

According to the second embodiment of the present invention, the number of calculations for tensor product calculations is reduced. In other words, according to the second embodiment, full tensor product calculations or partial tensor production calculations are performed depending on whether predetermined part of received data are non-zero data or zero data.

For example, with partial tensor product calculating units as shown in FIGS. 18 to 26, assuming each of addition, subtraction, multiplication, and sum-of-product calculation can be accomplished with single instruction, the number of instructions is 83 in case all of the tensor product calculations are performed by partial tensor product calculating units, which is less than that in case all of the tensor product calculations are executed by tensor product calculating units by 299 instructions.

In addition, in contrast to the first embodiment, in which all of the received DCT coefficients of each tensor product calculating unit must be zero data to reduce the number of calculations, according to the second embodiment, even if received coefficients (00), (02), (20), (22), (01), (03), (21), (10), (30), (12), and (11) are non-zero coefficients, the number of calculations can be reduced as partial tensor product calculating units are selected.

According to the third embodiment, in addition to that the number of calculations for tensor product calculations can be reduced, the number of calculations necessary for determining the necessity of tensor product calculations can be also reduced. This is because, by regarding all of the DCT coefficients up to EOB as non-zero, it is not at all necessary to examine whether or not received DCT coefficients are zero data.

Thus, only eight determinations using EOB are necessary instead of examining each of 64 pieces of received DCT coefficients.

According to the fourth embodiment, the number of calculations required to decide which calculation should be selected is reduced as compared with the second embodiment. This is because, by regarding all of the DCT coefficients up to EOB as non-zero, it is not at all necessary to determine whether or not all of the received data of tensor production calculations other than received data of partial tensor production calculations are zero data.

Thus, only nine determinations of selection using EOB are necessary instead of examining each of 64 pieces of received DCT coefficients.

The present invention is described referring to the above-mentioned embodiments. However, the present invention is not limited to the above-mentioned embodiments. Thus, it should be understood that the present invention includes various modifications of the above embodiments.

As described above, the present invention has the following effects.

(1) According to the first aspect of the present invention, the number of calculations for tensor product calculations can be reduced.

This is because, according to the first aspect of the present invention, when all of the received data of each tensor product calculation are zero data, each tensor product calculation is not performed. Thus, the number of tensor product calculations can be reduced.

(2) According to the second aspect of the present invention, the number of calculations for tensor product calculations is reduced. In other words, according to the second aspect, full tensor product calculations or partial tensor production calculations are performed depending on whether a predetermined part of received data are non-zero data or zero data.

(3) According to the third aspect of the present invention, the number of calculations for tensor product calculations can be reduced. In addition, the number of calculations necessary for determining the necessity of tensor product calculations can be also reduced. This is because it is not necessary to determine whether or not received data are zero data. Instead, data up to EOB addresses are treated as non-zero data.

Thus, it is not necessary to determine 64 pieces of received data. Instead, determining operation with EOB address is executed eight times.

(4) According to the fourth aspect of the present invention, the number of calculations of selecting units that select either partial tensor product calculations or tensor product calculations can be reduced in comparison with the second aspect. This is because it is not necessary to determine whether or not all received data of tensor production calculations other than received data of partial tensor production calculations are zero data. Instead, determining operation with EOB address is executed nine times.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A two-dimensional inverse discrete cosine transform circuit, which comprises:

a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction;

a second tensor product calculating unit for receiving (02), (06), (42), and (46) as transform coefficients;

a third tensor product calculating unit for receiving (20), (24), (60), and (64) as transform coefficients;

a fourth tensor product calculating unit for receiving (22), (26), (62), and (66) as transform coefficients;

a fifth tensor product calculating unit for receiving (01), (03), (05), (07), (41), (43), (45), and (47) as transform coefficients;

a sixth tensor product calculating unit for receiving (21), (23), (25), (27), (61), (63), (65), and (67) as transform coefficients;

a seventh tensor product calculating unit for receiving (10), (14), (30), (34), (50), (54), (70), and (74) as transform coefficients;

an eighth tensor product calculating unit for receiving (12), (16), (32), (36), (52), (56), (72), and (76) as transform coefficients;

a ninth tensor product calculating unit for receiving (11), (13), (15), (17), (31), (33), (35), (37), (51), (53), (55), (57), (71), (73), (75), and (77) as transform coefficients;

a first two-dimensional butterfly calculating unit for receiving calculated results of said first to fourth tensor product calculating units;

a first one-dimensional butterfly calculating unit for receiving calculated results of said fifth and sixth tensor product calculating units;

a second one-dimensional butterfly calculating unit for receiving calculated results of said seventh and eighth tensor product calculating units;

a second two-dimensional butterfly calculating unit for receiving a calculated result of said first two-dimensional butterfly calculating unit, calculated results of said first and second one-dimensional butterfly calculating units, and a calculated result of said ninth tensor product calculating unit; and first to ninth determining units for receiving input data of said first to ninth tensor product calculating units, wherein said first to ninth determining units determine whether all of the received data have non-zero data and send the determined results to the relevant tensor product calculating units, and wherein said first to ninth tensor product calculating units do not perform tensor product calculations when said first to ninth determining units have determined that all of the received data are zero data, respectively.

2. A two-dimensional inverse discrete cosine transform circuit, which comprises:

a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction;

a second tensor product calculating unit for receiving (02), (06), (42), and (46) as transform coefficients;

a third tensor product calculating unit for receiving (20), (24), (60), and (64) as transform coefficients;

a fourth tensor product calculating unit for receiving (22), (26), (62), and (66) as transform coefficients;

a fifth tensor product calculating unit for receiving (01), (03), (05), (07), (41), (43), (45), and (47) as transform coefficients;

a sixth tensor product calculating unit for receiving (21), (23), (25), (27), (61), (63), (65), and (67) as transform coefficients;

a seventh tensor product calculating unit for receiving (10), (14), (30), (34), (50), (54), (70), and (74) as transform coefficients;

an eighth tensor product calculating unit for receiving (12), (16), (32), (36), (52), (56), (72), and (76) as transform coefficients;

a ninth tensor product calculating unit for receiving (11), (13), (15), (17), (31), (33), (35), (37), (51), (53), (55), (57), (71), (73), (75), and (77) as transform coefficients;

a first two-dimensional butterfly calculating unit for receiving calculated results of said first to fourth tensor product calculating units;

a first one-dimensional butterfly calculating unit for receiving calculated results of said fifth and sixth tensor product calculating units;

a second one-dimensional butterfly calculating unit for receiving calculated results of said seventh and eighth tensor product calculating units;

a second two-dimensional butterfly calculating unit for receiving a calculated result of said first two-dimensional butterfly calculating unit, calculated results of said first and second one-dimensional butterfly calculating units, and a calculated result of said ninth tensor product calculating unit;

first to ninth partial tensor product calculating units for performing tensor product calculations with a predetermined part of received data of said first to ninth tensor product calculating units; and first to ninth selecting units for receiving input data of said first to ninth tensor product calculating units, wherein said first to ninth selecting units determine whether or not received data thereof other than received data of said first to ninth partial tensor product calculating unit have non-zero data, and sends the determined results to the relevant tensor product calculating units and the relevant partial tensor product calculating units, respectively wherein the relevant tensor product calculating units perform tensor product calculations when the received data other than received data of the relevant partial tensor product calculating units have non-zero data, respectively and wherein the relevant partial tensor product calculating units perform partial tensor product calculations and substitutes supplied data of the relevant tensor product calculating units with supplied data of the relevant partial tensor product calculating units when all of the received data other than received data of the relevant partial tensor product calculating units are zero data, respectively.

3. A two-dimensional inverse discrete cosine transform circuit, which comprises:

a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction;

a second tensor product calculating unit for receiving (02), (06), (42), and (46) as transform coefficients;

a third tensor product calculating unit for receiving (20), (24), (60), and (64) as transform coefficients;

a fourth tensor product calculating unit for receiving (22), (26), (62), and (66) as transform coefficients;

a fifth tensor product calculating unit for receiving (01), (03), (05), (07), (41), (43), (45), and (47) as transform coefficients;

a sixth tensor product calculating unit for receiving (21), (23), (25), (27), (61), (63), (65), and (67) as transform coefficients;

a seventh tensor product calculating unit for receiving (10), (14), (30), (34), (50), (54), (70), and (74) as transform coefficients;

an eighth tensor product calculating unit for receiving (12), (16), (32), (36), (52), (56), (72), and (76) as transform coefficients;

a ninth tensor product calculating unit for receiving (11), (13), (15), (17), (31), (33), (35), (37), (51), (53), (55), (57), (71), (73), (75), and (77) as transform coefficients;

a first two-dimensional butterfly calculating unit for receiving calculated results of said first to fourth tensor product calculating units;

a first one-dimensional butterfly calculating unit for receiving calculated results of said fifth and sixth tensor product calculating units;

a second one-dimensional butterfly calculating unit for receiving calculated results of said seventh and eighth tensor product calculating units;

a second two-dimensional butterfly calculating unit for receiving a calculated result of said first two-dimensional butterfly calculating unit, calculated results of said first and second one-dimensional butterfly calculating units, and a calculated result of said ninth tensor product calculating unit; and first to eighth determining units corresponding to said second to ninth tensor product calculating units, respectively, wherein said first to eighth determining units receive position information of end-of-block (EOB) code, treat DCT coefficients ranging from coefficient (00) to EOB code as non-zero data, determine whether or not received data of the relevant tensor product calculating units have non-zero data, and send the determined results to the relevant tensor product calculating units, respectively and wherein the relevant tensor product calculating units do not perform tensor product calculations when the relevant determining units have determined that all of the received data are zero data, respectively.

4. A two-dimensional inverse discrete cosine transform circuit, which comprises:

a first tensor product calculating unit for receiving (00), (04), (40), and (44) as transform coefficients (ij) of eight-point×eight-point two-dimensional discrete cosine transform (DCT) where i and j are an integer ranging from 0 to 7, i being an address in vertical direction, j being an address in horizontal direction;

a second tensor product calculating unit for receiving (02), (06), (42), and (46) as transform coefficients;

a third tensor product calculating unit for receiving (20), (24), (60), and (64) as transform coefficients;

a fourth tensor product calculating unit for receiving (22), (26), (62), and (66) as transform coefficients;

a fifth tensor product calculating unit for receiving (01), (03), (05), (07), (41), (43), (45), and (47) as transform coefficients;

a sixth tensor product calculating unit for receiving (21), (23), (25), (27), (61), (63), (65), and (67) as transform coefficients;

a seventh tensor product calculating unit for receiving (10), (14), (30), (34), (50), (54), (70), and (74) as transform coefficients;

an eighth tensor product calculating unit for receiving (12), (16), (32), (36), (52), (56), (72), and (76) as transform coefficients;

a ninth tensor product calculating unit for receiving (11), (13), (15), (17), (31), (33), (35), (37), (51), (53), (55), (57), (71), (73), (75), and (77) as transform coefficients;

a first two-dimensional butterfly calculating unit for receiving calculated results of said first to fourth tensor product calculating units;

a first one-dimensional butterfly calculating unit for receiving calculated results of said fifth and sixth tensor product calculating units;

a second one-dimensional butterfly calculating unit for receiving calculated results of said seventh and eighth tensor product calculating units;

a second two-dimensional butterfly calculating unit for receiving a calculated result of said first two-dimensional butterfly calculating unit, calculated results of said first and second one-dimensional butterfly calculating units, and a calculated result of said ninth tensor product calculating unit;

first to ninth partial tensor product calculating units for performing tensor product calculations with predetermined part of received data of said first to ninth tensor product calculating units; and first to ninth selecting units corresponding to said first to ninth tensor product calculating units, respectively, wherein said first to ninth selecting units receive position information of end-of-block (EOB) code of the received DCT coefficients, treat DCT coefficients ranging from coefficient (00) to EOB code as non-zero data, determine whether or not received data of the relevant tensor product calculating units other than received data of the relevant partial tensor product calculating units have non-zero data, and send the determined results to the relevant tensor product calculating units and the relevant partial tensor product calculating units, respectively wherein the relevant tensor product calculating units perform tensor product calculations when the received data other than the received data of the relevant partial tensor product calculating units have non-zero data, respectively and wherein the relevant partial tensor product calculating units perform partial tensor product calculations and substitute supplied data of the relevant tensor product calculating units with supplied data of the relevant partial tensor product calculating units when the received data other than the received data of the relevant partial tensor product calculating unit do not have non-zero data, respectively.

5. A two-dimensional inverse discrete cosine transform circuit comprising:

tensor product calculating units, butterfly calculating units connected to said tensor product calculating units for performing a two-dimensional inverse discrete cosine transform, and a determining unit corresponding to each of said tensor product calculating units for determining whether a corresponding DCT coefficient is zero or non-zero; and wherein each tensor product calculation of the tensor product calculating units is executed or not executed depending upon whether the corresponding DCT coefficient is zero data or non-zero data.

6. The two-dimensional inverse discrete cosine transform circuit as set forth in claim 5, which further comprises:

means for causing each of the tensor product calculating units not to perform tensor product calculation when all of the corresponding DCT coefficients of corresponding tensor product calculating units are zero data.

7. The two-dimensional inverse discrete cosine transform circuit as set forth in claim 6, which further comprises:

means for receiving a position information of end-of-block (EOB) code for determining whether each of the coefficients is zero data or non-zero data.

8. The two-dimensional inverse discrete cosine transform circuit as set forth in claim 5, which further comprises:

partial tensor product calculating units for performing partial tensor product calculations with a predetermined part of the corresponding DCT coefficients of the corresponding tensor product calculating units, wherein each of the tensor product calculating units perform tensor product calculation when corresponding data other than data of the corresponding partial tensor product calculating units have non-zero data, and wherein each of the partial tensor product calculating units perform partial tensor product calculation and substitute supplied data of each of the tensor product calculating units with supplied data of the corresponding partial product calculating units when all of the corresponding data other than data of each of the partial tensor product calculating units are zero data.

9. The two-dimensional inverse discrete cosine transform circuit as set forth in claim 8, which further comprises:

means for receiving a position information of end-of-block (EOB) code for determining whether each of the coefficients is zero data or non-zero data.

10. The two-dimensional inverse discrete cosine transform circuit as set forth in claim 5, which further comprises:

means for receiving a position information of end-of-block (EOB) code for determining whether each of the coefficients is zero data or non-zero data.

11. A method of two-dimensional inverse discrete cosine transform, which comprises:

a step of first tensor product calculation for (00), (04), (40), and (44) wherein (ij) represents coefficient of 8 point by 8 point two-dimensional discrete cosine transform at i-th position in vertical direction and j-th position in horizontal direction;

a step of second tensor product calculation for (02), (06), (42), and (46);

a step of third tensor product calculation for (20), (24), (60), and (64);

a step of fourth tensor product calculation for (22), (26), (62), and (66);

a step of fifth tensor product calculation for (01), (03), (05), (07), (41), (43), (45), and (47);

a step of sixth tensor product calculation for (21), (23), (25), (27), (61), (63), (65), and (67);

a step of seventh tensor product calculation for (10), (14), (30), (34), (50), (54), (70), and (74);

a step of eighth tensor product calculation for (12), (16), (32), (36), (52), (56), (72), and (76);

a step of ninth tensor product calculation for (11), (13), (15), (17), (31), (33), (35), (37), (51), (53), (55), (57), (71), (73), (75), and (77);

a step of first two-dimensional butterfly calculation for calculated results of said first to fourth tensor product calculation;

a step of first one-dimensional butterfly calculation for calculated results of said fifth and sixth tensor product calculation;

a step of second one-dimensional butterfly calculation for calculated results of said seventh and eighth tensor product calculation;

a step of second two-dimensional butterfly calculation for a calculated result of said first two-dimensional butterfly calculation, calculated results of said first and second one-dimensional butterfly calculation, and a calculated result of said ninth tensor product calculation; and steps of first to ninth determination for input data of said steps of first to ninth tensor product calculation, respectively wherein said steps of first to ninth determination determine whether there is non-zero data in input data, and wherein said steps of first to ninth tensor product calculation are not performed when said steps of first to ninth determination have determined that all of the input data are zero data, respectively.

12. A method of two-dimensional inverse discrete cosine transform, which comprises:

a step of first tensor product calculation for (00), (04), (40), and (44) wherein (ij) represents coefficient of 8 point by 8 point two-dimensional discrete cosine transform at i-th position in vertical direction and j-th position in horizontal direction;

a step of second tensor product calculation for (02), (06), (42), and (46);

a step of third tensor product calculation for (20), (24), (60), and (64);

a step of fourth tensor product calculation for (22), (26), (62), and (66);

a step of fifth tensor product calculation for (01), (03), (05), (07), (41), (43), (45), and (47);

a step of sixth tensor product calculation for (21), (23), (25), (27), (61), (63), (65), and (67);

a step of seventh tensor product calculation for (10), (14), (30), (34), (50), (54), (70), and (74);

a step of eighth tensor product calculation for (12), (16), (32), (36), (52), (56), (72), and (76);

a step of ninth tensor product calculation for (11), (13), (15), (17), (31), (33), (35), (37), (51), (53), (55), (57), (71), (73), (75), and (77);

a step of first two-dimensional butterfly calculation for calculated results of said first to fourth tensor product calculation;

a step of first one-dimensional butterfly calculation for calculated results of said fifth and sixth tensor product calculation;

a step of second one-dimensional butterfly calculation for calculated results of said seventh and eighth tensor product calculation;

a step of second two-dimensional butterfly calculation for a calculated result of said first two-dimensional butterfly calculation, calculated results of said first and second one-dimensional butterfly calculation, and a calculated result of said ninth tensor product calculation;

steps of first to ninth partial tensor product calculation with predetermined part of input data of said steps of first to ninth tensor product calculation, respectively; and steps of first to ninth selection based on input data of said steps of first to ninth tensor product calculation, respectively, wherein said steps of first to ninth selection determine whether or not input data thereof other than input data of said steps of first to ninth partial tensor product calculation have non-zero data, wherein the relevant steps of tensor product calculation are performed when the input data other than input data of the relevant steps of partial tensor product calculation have non-zero data, respectively and wherein the relevant steps of partial tensor product calculation are performed and the calculated results of the relevant steps of tensor product calculation are substituted with the calculated results of the relevant steps of partial tensor product calculation when all of the input data other than input data of the relevant steps of partial tensor product calculation are zero data, respectively.

13. A method of two-dimensional inverse discrete cosine transform, which comprises:

a step of first tensor product calculation for (00), (04), (40), and (44) wherein (ij) represents coefficient of 8 point by 8 point two-dimensional discrete cosine transform at i-th position in vertical direction and j-th position in horizontal direction;

a step of second tensor product calculation for (02), (06), (42), and (46);

a step of third tensor product calculation for (20), (24), (60), and (64);

a step of fourth tensor product calculation for (22), (26), (62), and (66);

a step of fifth tensor product calculation for (01), (03), (05), (07), (41), (43), (45), and (47);

a step of sixth tensor product calculation for (21), (23), (25), (27), (61), (63), (65), and (67);

a step of seventh tensor product calculation for (10), (14), (30), (34), (50), (54), (70), and (74);

a step of eighth tensor product calculation for (12), (16), (32), (36), (52), (56), (72), and (76);

a step of ninth tensor product calculation for (11), (13), (15), (17), (31), (33), (35), (37), (51), (53), (55), (57), (71), (73), (75), and (77);

a step of first two-dimensional butterfly calculation for calculated results of said first to fourth tensor product calculation;

a step of first one-dimensional butterfly calculation for calculated results of said fifth and sixth tensor product calculation;

a step of second one-dimensional butterfly calculation for calculated results of said seventh and eighth tensor product calculation;

a step of second two-dimensional butterfly calculation for a calculated result of said first two-dimensional butterfly calculation, calculated results of said first and second one-dimensional butterfly calculation, and a calculated result of said ninth tensor product calculation; and steps of first to eighth determination corresponding to said steps of second to ninth tensor product calculation, respectively, wherein said steps of first to eighth determination input position information of end-of-block (EOB) code, treat DCT coefficients ranging from coefficient (00) to EOB code as non-zero data, determine whether or not input data of the relevant steps of tensor product calculation have non-zero data, respectively and wherein the relevant steps of tensor product calculation are not performed when the relevant steps of determination have determined that all of the received data are zero data, respectively.

14. A method of two-dimensional inverse discrete cosine transform, which comprises:

a step of first tensor product calculation for (00), (04), (40), and (44) wherein (ij) represents coefficient of 8 point by 8 point two-dimensional discrete cosine transform at i-th position in vertical direction and j-th position in horizontal direction;

a step of second tensor product calculation for (02), (06), (42), and (46);

a step of third tensor product calculation for (20), (24), (60), and (64);

a step of fourth tensor product calculation for (22), (26), (62), and (66);

a step of fifth tensor product calculation for (01), (03), (05), (07), (41), (43), (45), and (47);

a step of sixth tensor product calculation for (21), (23), (25), (27), (61), (63), (65), and (67);

a step of seventh tensor product calculation for (10), (14), (30), (34), (50), (54), (70), and (74);

a step of eighth tensor product calculation for (12), (16), (32), (36), (52), (56), (72), and (76);

a step of ninth tensor product calculation for (11), (13), (15), (17), (31), (33), (35), (37), (51), (53), (55), (57), (71), (73), (75), and (77);

a step of first two-dimensional butterfly calculation for calculated results of said first to fourth tensor product calculation;

a step of first one-dimensional butterfly calculation for calculated results of said fifth and sixth tensor product calculation;

a step of second one-dimensional butterfly calculation for calculated results of said seventh and eighth tensor product calculation;

a step of second two-dimensional butterfly calculation for a calculated result of said first two-dimensional butterfly calculation, calculated results of said first and second one-dimensional butterfly calculation, and a calculated result of said ninth tensor product calculation;

steps of first to ninth partial tensor product calculation with predetermined part of input data of said steps of first to ninth tensor product calculation; and steps of first to ninth selection corresponding to said steps of first to ninth tensor product calculation, respectively, wherein said steps of first to ninth selection input position information of end-of-block (EOB) code of the input DCT coefficients, treat DCT coefficients ranging from coefficient (00) to EOB code as non-zero data, determine whether or not input data of the relevant steps of tensor product calculation other than input data of the relevant steps of partial tensor product calculation have non-zero data, wherein the relevant steps of tensor product calculation are performed when the input data other than the input data of the relevant steps of partial tensor product calculation have non-zero data, respectively and wherein the relevant steps of partial tensor product calculation are performed and the calculated results of the relevant steps of tensor product calculation are substituted with calculated results of the relevant steps of partial tensor product calculation when the input data other than the input data of the relevant steps of partial tensor product calculation do not have non-zero data respectively.

15. A method of two-dimensional inverse discrete cosine transform comprising the steps of:

determining whether corresponding DCT coefficients are zero data or non-zero data, performing a tensor product calculation performing a butterfly calculation, wherein the determination causes the tensor product calculation to be either performed or not performed.

16. The method of two-dimensional inverse discrete cosine transform as set forth in claim 15, further comprising the steps of:

determining if all of the corresponding DCT coefficients of the corresponding tensor product calculations are zero data and causing each of the tensor product calculations not to be performed when all of the corresponding DCT coefficients are zero data.

17. The method of two-dimensional inverse discrete cosine transform as set forth in claim 16, further comprising the step of:

receiving a position information of end-of-block (EOB) code for determining whether each of the coefficients is zero data or non-zero data.

18. The method of two-dimensional inverse discrete cosine transform as set forth in claim 15, further comprising the step of:

calculating a partial tensor product with a predetermined part of DCT coefficients of the corresponding tensor product calculation, wherein each of the tensor product calculations are performed when the corresponding data other than data of the corresponding partial tensor product calculation have non-zero data, respectively and wherein each of the partial tensor product calculations are performed and the calculated results of each of the tensor product calculations are substituted with the calculated results of the corresponding partial product calculations when all of the corresponding data other than data of each of the partial tensor product calculations are zero data, respectively.

19. The method of two-dimensional inverse discrete cosine transform as set forth in claim 18, further comprising the step of:

receiving a position information of end-of-block (EOB) code for determining whether each of the coefficients is zero data or non-zero data.

20. The method of two-dimensional inverse discrete cosine transform as set forth in claim 15, further comprising the step of:

receiving a position information of end-of-block (EOB) code for determining whether each of the coefficients is zero data or non-zero data.

* * * * *